United States Patent
Hu et al.

(10) Patent No.: US 11,328,772 B2
(45) Date of Patent: May 10, 2022

(54) REDUCING CURRENT IN CROSSBAR ARRAY CIRCUITS WITH LARGE OUTPUT RESISTANCE

(71) Applicant: TETRAMEM INC., Newark, CA (US)

(72) Inventors: Miao Hu, Newark, CA (US); Ning Ge, Newark, CA (US)

(73) Assignee: TetraMem, Inc., Fremont, CA (US)

( * ) Notice: Subject to any disclaimer, the term of this patent is extended or adjusted under 35 U.S.C. 154(b) by 128 days.

(21) Appl. No.: 16/921,918

(22) Filed: Jul. 6, 2020

(65) Prior Publication Data
US 2022/0005526 A1    Jan. 6, 2022

(51) Int. Cl.
| | |
|---|---|
| G11C 16/04 | (2006.01) |
| G11C 13/00 | (2006.01) |
| G06F 30/3308 | (2020.01) |
| G06F 17/16 | (2006.01) |

(52) U.S. Cl.
CPC .......... G11C 13/0069 (2013.01); G06F 17/16 (2013.01); G06F 30/3308 (2020.01); *G11C 2013/0078* (2013.01)

(58) Field of Classification Search
CPC ........ G11C 13/0069; G11C 2013/0078; G06F 30/3308
USPC .......................................................... 365/148
See application file for complete search history.

(56) References Cited

U.S. PATENT DOCUMENTS

| | | | |
|---|---|---|---|
| 10,079,058 B1 * | 9/2018 | Eleftheriou | G11C 13/004 |
| 2020/0193300 A1 * | 6/2020 | Kumar | G11C 13/0069 |

* cited by examiner

*Primary Examiner* — Vu A Le
(74) *Attorney, Agent, or Firm* — Jaffery Watson Mendonsa & Hamilton LLP

(57) ABSTRACT

Methods of using large output resistance with adjusted conductance mapping value to reduce the current in crossbar array circuit are disclosed. An example method of simulating a crossbar array circuit having a crossbar array, includes steps of: S1. testing the crossbar array; S2. calibrating a simulation model; S3. simulating the crossbar array with the simulation model, wherein a simulation result is generated after the S3; S4. determining a fixed ratio of ideal current from the simulation result; S5. adjusting conductance mapping value to let the crossbar array pass the fixed ratio of ideal current and generating a conductance matrix; S6. programming the conductance matrix to the crossbar array; S7. passing an input signal to the crossbar array and generating a computing result; and S8. checking the quality of computing results.

15 Claims, 24 Drawing Sheets

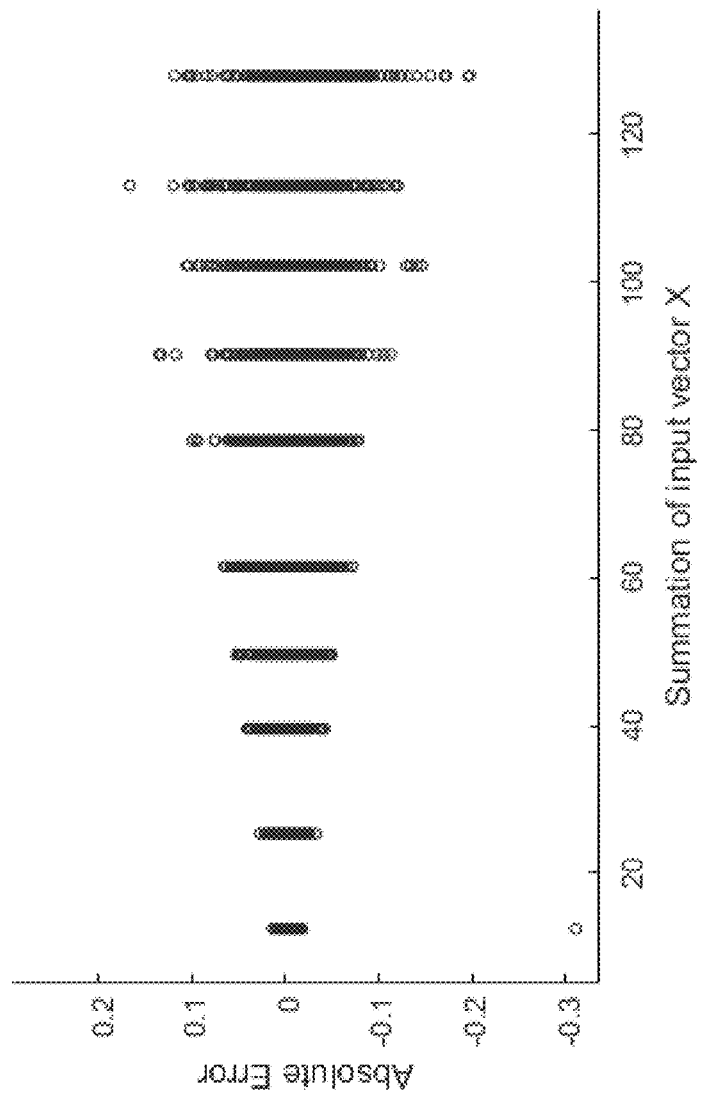

REDUCING CURRENT IN CROSSBAR ARRAY CIRCUITS WITH LARGE OUTPUT RESISTANCE

TECHNICAL FIELD

The present disclosure relates generally to crossbar array circuits and more specifically to reducing current in crossbar array circuits with large output resistance (Rout) having adjusted conductance mapping values.

BACKGROUND

Traditionally, a crossbar array circuit may include horizontal metal wire rows and vertical metal wire columns (or other electrodes) intersecting with each other, with crossbar devices formed at the intersecting points. A crossbar array may be used in non-volatile solid-state memory, signal processing, control systems, high-speed image processing systems, neural network systems, and so on.

An RRAM is a two-terminal passive device that is capable of changing its resistance responsive to sufficient electrical stimulations. These characteristics have attracted significant attention for high-performance nonvolatile memory and in-memory computing applications. The resistance of the RRAM may be electrically switched between two states: a High-Resistance State (HRS) and a Low-Resistance State (LRS). Switching an RRAM from an HRS to an LRS may be referred to as a "Set" or "On" operation. Conversely, switching an RRAM from an LRS to an HRS may be referred to as a "Reset" or "Off" operation.

Vector-Matrix Multiplication (VMM) is one of the most important operations for computational applications. A memristor-based crossbar array circuit may perform VMMs. For instance, a crossbar array circuit may use current to do computation as I=V·G. Since voltage V is within a fixed range depending on the input signal, the energy consumption of the crossbar array circuit depends directly on conductance G. That is, if the conductance of the crossbar array circuit is too high, the current will be large, and the energy consumption will be high.

Large output resistance (Rout) may significantly reduce the total current in a crossbar array circuit, even with the same conductive memristors. This large output resistance locates at the output channel of a crossbar. For a 256×256 crossbar array, one 1 k ohm resistor at the output of the column can be regarded as increasing resistance by 1 k*256=256 k ohm for each of the 256 memristors in a column. However, direct linear mapping of matrix values to crossbar conductance will produce inaccurate VMM results, because the output is nonlinear due to the presence of a large Rout. How to adjust the passing current of a memristor device by appropriate conductance mapping is thus key to leveraging on circuit implementation with a large Rout.

SUMMARY

Systems and methods for reducing current in crossbar array circuits with large output resistance (Rout) having adjusted conductance mapping values are disclosed.

An example method of simulating a crossbar array circuit having a crossbar array, in some implementations, includes steps of: S1. testing the crossbar array; S2. calibrating a simulation model; S3. simulating the crossbar array with the simulation model, wherein a simulation result is generated after the S3; S4. determining a fixed ratio of ideal current from the simulation result; S5. adjusting conductance mapping value to let the crossbar array pass the fixed ratio of ideal current and generating a conductance matrix; S6. programming the conductance matrix to the crossbar array; S7. passing an input signal to the crossbar array and generating a computing result; and S8. checking the quality of computing results; if the computing results are qualified, transmitting the computing results; if the computing results are not qualified, adjusting the conductance mapping value with consideration of programming errors and defects, and returning to S5.

In some implementations, the crossbar array circuit further includes: one or many of cross-point devices; an output resistance connected to the crossbar array; and an ADC configured to receive signals from the crossbar array.

In some implementations, the crossbar array circuit further includes: one or many of cross-point devices; an output resistance connected to the crossbar array; a TIA connected to the output resistance; and an ADC configured to receive signals from the TIA.

In some implementations, a resistance of the output resistance is ranged between 100 ohm and 1000 ohm when an array size of the crossbar array is 128×128 or 256×256.

In some implementations, a maximum of an input voltage of the crossbar array is 0.2 V.

In some implementations, an initial conductance of the crossbar array is generated during the S1.

In some implementations, the calibrating step is configured to let the simulation model accounting for device physics and circuit issues of the crossbar array.

In some implementations, the simulation result includes an ideal and real current data, and an ideal and real vector-matrix multiplication results of the crossbar array.

An example non-transitory computer-readable storage medium storing one or more programs, the one or more programs comprising instructions, which when executed by a computing system with one or more processors, cause the computing system to execute a method of simulating a crossbar array circuit having a crossbar array, includes steps of: S1. testing the crossbar array; S2. calibrating a simulation model; S3. simulating the crossbar array with the simulation model, wherein a simulation result is generated after the S3; S4. determining a fixed ratio of ideal current from the simulation result; S5. adjusting conductance mapping value to let the crossbar array pass the fixed ratio of ideal current and generating a conductance matrix; S6. programming the conductance matrix to the crossbar array; S7. passing an input signal to the crossbar array and generating a computing result; and S8. checking the quality of computing results; if the computing results are qualified, transmitting the computing results; if the computing results are not qualified, adjusting the conductance mapping value with consideration of programming errors and defects, and returning to S5.

In some implementations, the crossbar array circuit further includes: one or many of cross-point devices; an output resistance connected to the crossbar array; and an ADC configured to receive signals from the crossbar array.

In some implementations, the crossbar array circuit further includes: one or many of cross-point devices; an output resistance connected to the crossbar array; a TIA connected to the output resistance; and an ADC configured to receive signals from the TIA.

In some implementations, a resistance of the output resistance ranged between 100 ohm and 1000 ohm when an array size of the crossbar array is 128×128 or 256×256.

In some implementations, an initial conductance of the crossbar array is generated during the S1.

In some implementations, the calibrating step is configured to let the simulation model accounting for device physics and circuit issues of the crossbar array.

In some implementations, wherein the simulation result includes an ideal and real current data, and an ideal and real vector-matrix multiplication results of the crossbar array.

BRIEF DESCRIPTION OF THE DRAWINGS

FIG. 10C is an error pattern illustrating errors between VMM result versus input vector in the 256×256 crossbar array circuit with Rout=500 ohm and DCT mapping.

The implementations disclosed herein are illustrated by way of example, and not by way of limitation, in the figures of the accompanying drawings. Like reference numerals refer to corresponding parts throughout the drawings.

DETAILED DESCRIPTION

The method of using a large Rout with adjusted conductance mapping value to reduce the current in the crossbar array circuit is disclosed. The technologies described in the present disclosure may provide the following technical advantages.

First, due to the circuit parasitics and defects, a realistic crossbar does not perform perfect matrix multiplication. By utilizing the conversion algorithm compensation with the added Rout in accordance with the present disclosure, the crossbar array may not only improve the accuracy of computing by compensating the signal loss due to the circuit parasitics but also reduce overall current. The systems and methods described in the present disclosure may mitigate circuit parasitics and defects in the crossbar array circuit.

Second, to reduce the power consumption of the crossbar array circuit, the large Rout is added to the circuit to reduce the current of each memristor device. For instance, in a 128×128, or 256×256 crossbar array circuit, it is estimated to reduce current by about 40 times. The benefit of adding Rout is significant. However, direct linear mapping is no longer operational since the output current is nonlinear due to a large Rout. Therefore, by modifying the conductance mapping value to be a fixed small percentage of ideal current in accordance with some implementations of the present disclosure, the mapping is achievable.

Third, the technologies disclosed provide a dynamic range of conductance (resistance) for memristors to be matched and operational under the circuit with the added Rout. The present disclosure simulates different Rout in different circuit sizes to find suitable dynamic conductance range of memristors. It, therefore, provides users a method to check how much their Rout can be under their circuit size and their dynamic conductance range of memristors.

Figure 1B:
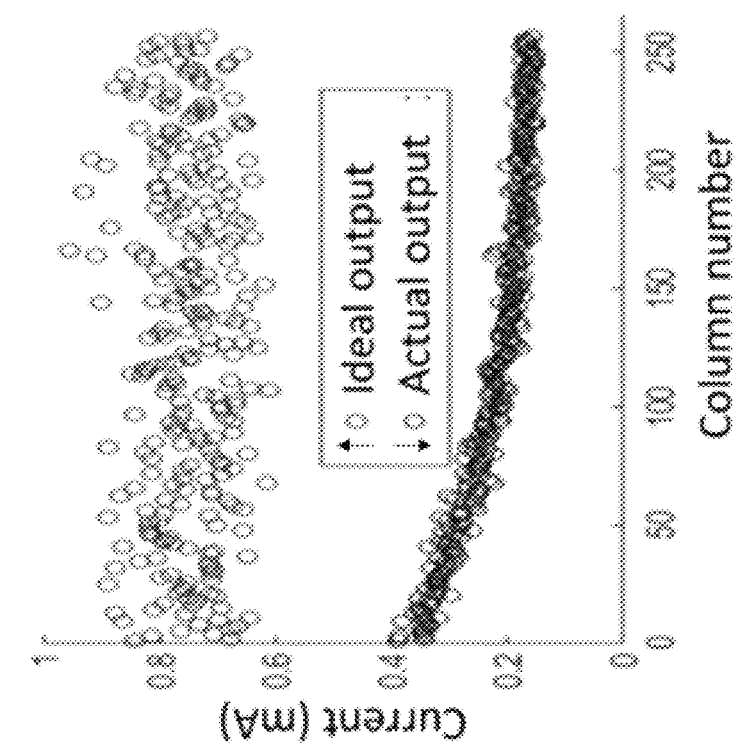
FIG. 1B is a current chart illustrating ideal current output and actual current output across memristor devices in a 256×256 crossbar array circuit.
Figure 1A:
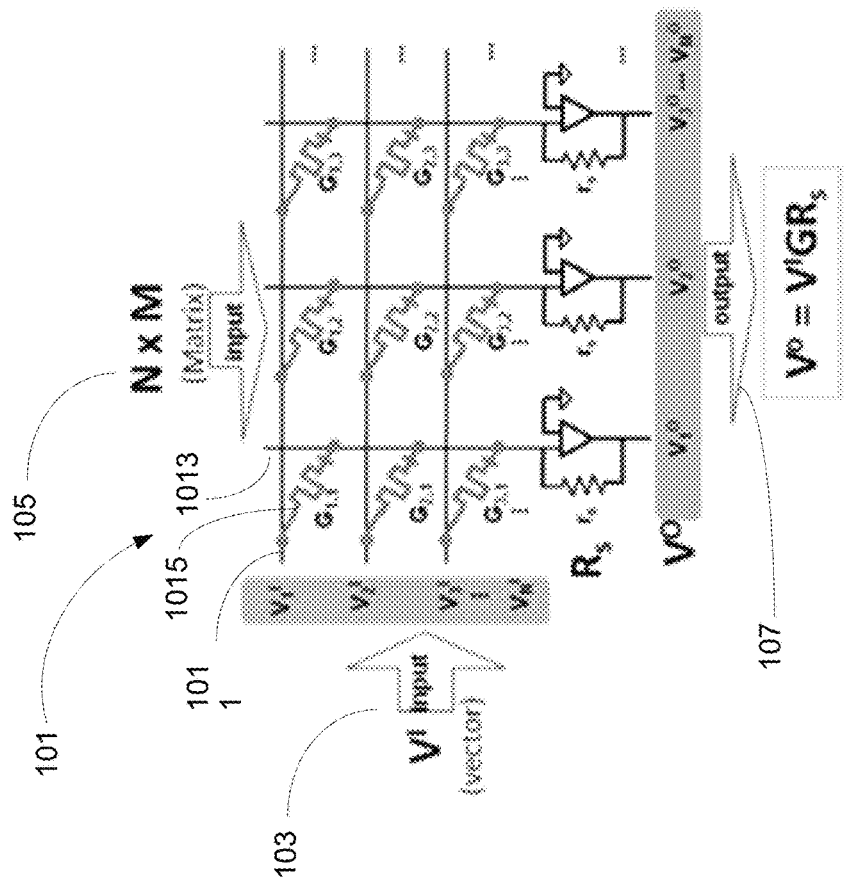
FIG. 1A is a block diagram illustrating an example crossbar array circuit.

FIG. 1A is a block diagram 1000 illustrating an example crossbar array circuit 101. As shown in FIG. 1A, this is a conventional memristor crossbar array circuit for matrix multiplication. (Hu, M. et al., "Dot-product engine for neuromorphic computing: programming 1T1M crossbar to accelerate matrix-vector multiplication," DAC, 2016.) In an ideal crossbar array circuit where memristors are linear and all circuit parasitics are ignored, applying an input vector voltage Vin to the rows of the crossbar and sensing the output voltage Vout with Trans-Impedance Amplifiers (TIA) at all columns, one get Vout=VinGRS, where RS is the feedback resistance, and G is the conductance matrix of each cross-point device. For analog computing applications, memristors are desired to have stable, continuous linear conductance states for representing matrix values. However, direct linear mapping leads to poor computing accuracy in real crossbars.

FIG. 1B is a current chart 1100 illustrating ideal current output and actual current output across memristor devices in a 256×256 crossbar array circuit. As shown in FIG. 1B, as an example of all voltages across devices in a 256×256 crossbar array circuit, positive matrix values are linearly mapped to memristor conductance, but the actual output values are very different from the ideal output values due to nonideal device and circuit issues. Therefore, mapping algorithms and hardware training schemes are required.

Figure 2:
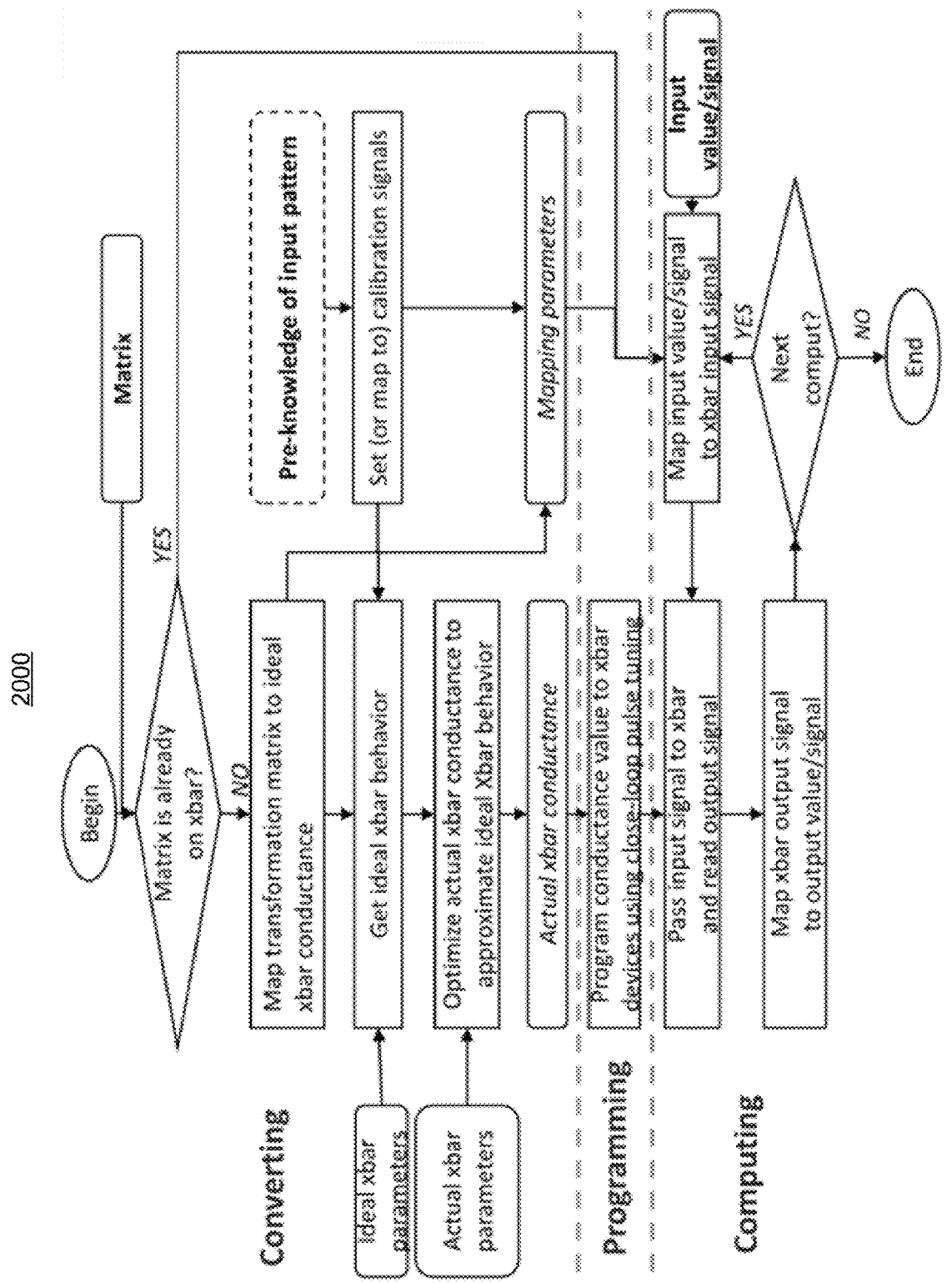
FIG. 2 is a flowchart illustrating a Dot-Product Engine (DPE) workflow for VMM computations using a conversion algorithm.

FIG. 2 is a flowchart illustrating a Dot-Product Engine (DPE) workflow of VMM computation using a conversion algorithm. As shown in FIG. 2, the DPE workflow includes the basic flow for the conversion algorithm demonstrated in Hu, M. et al., DAC, 2016. It is noted that the conversion algorithm in the above reference is incorporated in the present disclosure. It is also noted that although the conversion algorithm may be applied in accordance with some implementations of the present disclosure, other algorithms that are suitable for implementations of the present disclosure may also be applied.

Figures 3A, 3B:
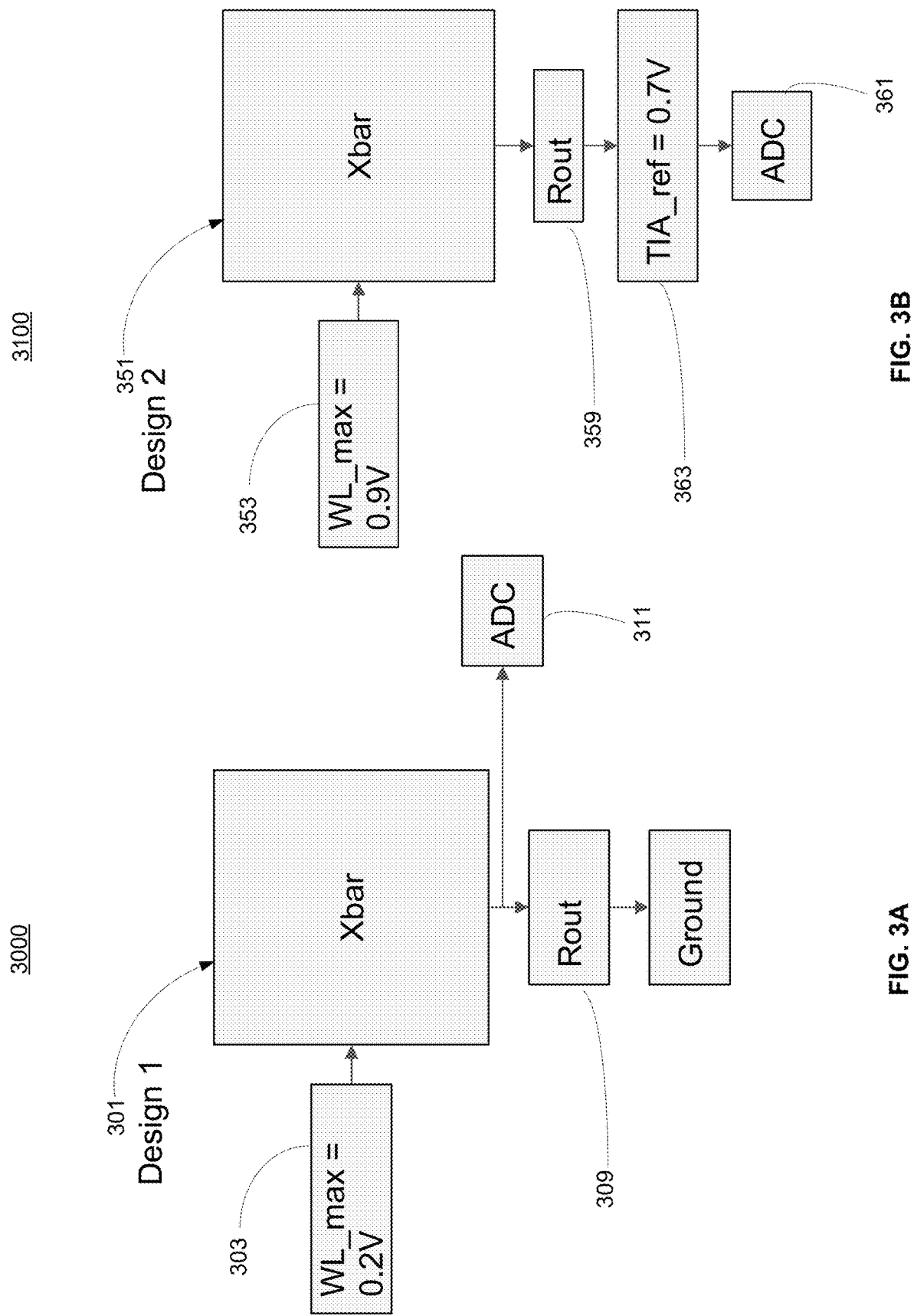
FIGS. 3A-3B are block diagrams illustrating example crossbar array circuits with large Rout in accordance with some implementations of the present disclosure.

FIGS. 3A-3B are block diagrams 3000 and 3100 illustrating examples of crossbar array circuits with large Rout in accordance with some implementations of the present disclosure. There are two designs of large Rout at the column output. The first design, as shown in FIG. 3A, includes an input voltage 303 with lower voltage 0.2 V provided to word lines of a crossbar array 301. An output resistance Rout 309 is then connected to bit lines of the crossbar array 301. The output resistance Rout 309 is grounded. The output signal of the crossbar array 301 is then transmitted to an analog-to-digital converter (ADC) 311. This design does not need a Trans-Impedance Amplifier (TIA) at the output end and it only requires as low as 0.2 V to operate. However, the ADC 311 in this design may be required to read or differentiate signals at around 200 mV.

The second design, as shown in FIG. 3B, includes an input voltage 353 with higher voltage 0.9 V provided to word lines of a crossbar array 351. An output resistance Rout 359 is then connected to bit lines of the crossbar array 351. The output resistance Rout 359 is then connected to a TIA 363 which can read out the output signal at around 0 to 0.7 V. The output signal of the TIA 363 is then transmitted to an analog-to-digital converter (ADC) 361. This design enables the TIA to read the output signal at around 0 to 0.7 V. However, it requires an additional TIA which generates additional area consumption and power consumption.

Figure 4:
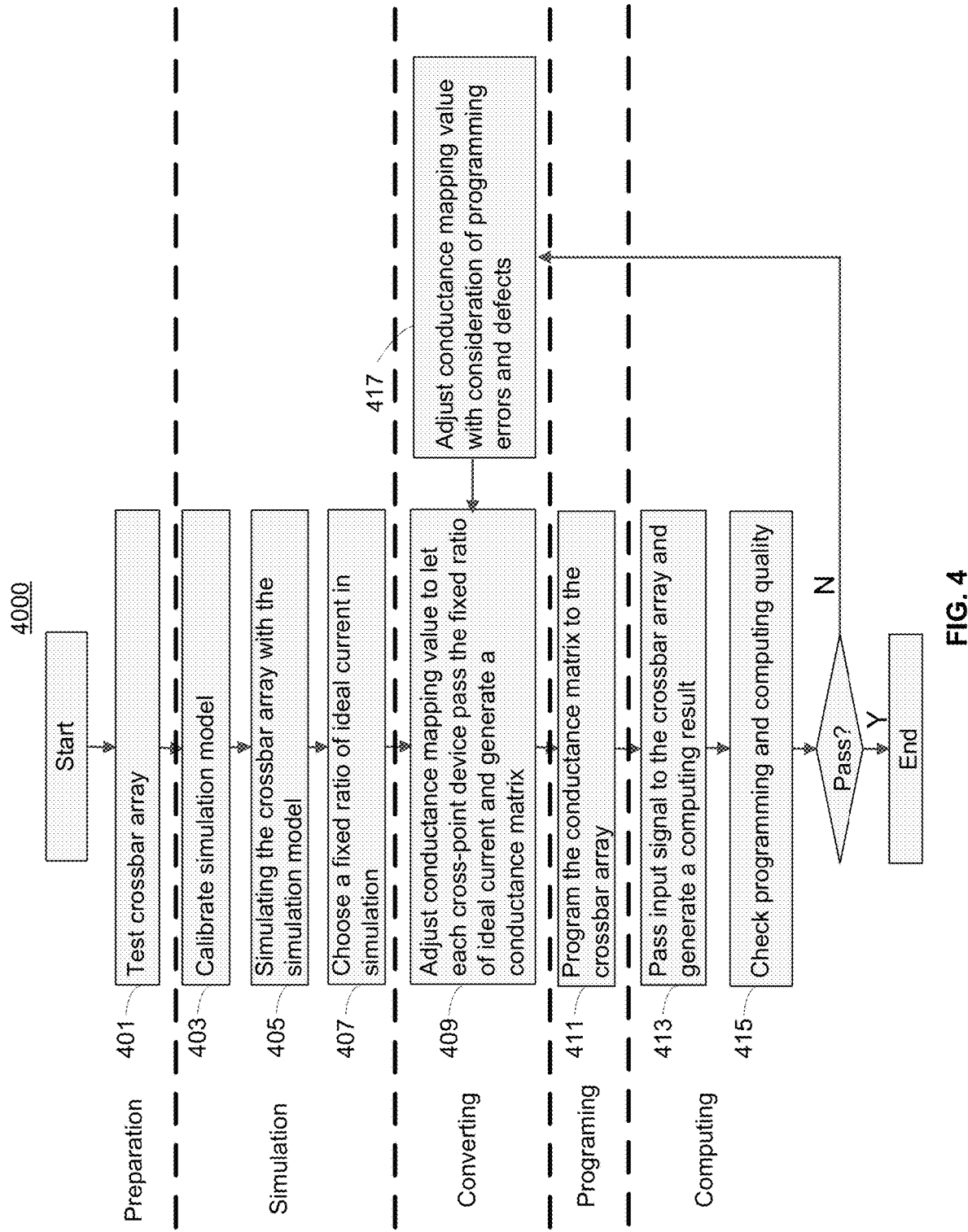
FIG. 4 is a flowchart illustrating an example method for reducing current in crossbar array circuits using a large Rout in accordance with some implementations of the present disclosure.

FIG. 4 is a flowchart 4000 illustrating an example method of using a large Rout to reduce the current in crossbar array circuit in accordance with some implementations of the present disclosure.

First, during the preparation stage, the method includes testing a crossbar array (step 401). An initial conductance of the crossbar array may be generated during the test.

Second, during the simulation stage, the method includes calibrating a simulation model (step 403). The calibration may let the simulation model accounting for device physics and circuit issues to reduce computational errors.

Next, the method further includes simulating the crossbar array with the simulation model (step 405). After the simulation, both the ideal and real data of crossbar array including current and vector-matrix multiplication results are generated. These simulation results will be shown and discussed later.

Next, after the simulation, the method further includes determining a fixed ratio of ideal current from the simulation result (step 407).

Third, during the converting stage, the method includes adjusting conductance mapping value to let each cross-point device of the crossbar array pass the fixed ratio of ideal current and generating a conductance matrix (step 409).

Fourth, during the programming stage, the method includes programming the conductance matrix to the crossbar array (step 411).

Fifth, during the computing stage, the method includes passing an input signal to the crossbar array and generating a computing result (step 413).

Next, the method further includes checking programming and computing quality (step 415). If the programming and computing result is qualified, the flow is ended, and the output result will be transmitted; if the programming and computing result is not qualified, adjust the conductance value with consideration of programming errors and defects (step 417) and return to step 409.

As mentioned above, the key is to determine the ratio of ideal current "r". From the simulation, if the simulated VMM result (y) vs. ideal VMM result (x) can be roughly linearly fitted by one line y=a*x+b, then the ratio of ideal current "r"=a. However, if the simulated VMM result (y) vs. ideal VMM result (x) can not be roughly linearly fitted by one line y=a*x+b, instead, it needs fitting column by column, then a specific ratio of ideal current "r" should be chosen for each column that is with a large variance in the linear fitting. Finally, all these fitting parameters will be merged into the post-processing anyway, so it would not cause any overhead in computation afterward.

Next, to set up the simulation, a customized SPICE-level crossbar array simulator, and a calibrated transistor model for TSMC 130 nm, a memristor thermal-aware model is selected. A random matrix and a discrete cosine transform (DCT) are selected to be a weight pattern in different simulations. The mapping method includes with or without conversion algorithm. Important parameters are as follow: Ron=2000 ohm, Roff=10000 ohm, Rwire=0.1 ohm, Rin=1 ohm, Vmax=0.2 V. Meanwhile, variables are as follow: Rout=100, 500, and 1000 ohm; array size=128×128, 256×256. The following FIGS. 5A-11C are all simulation results.

Figure 5B:
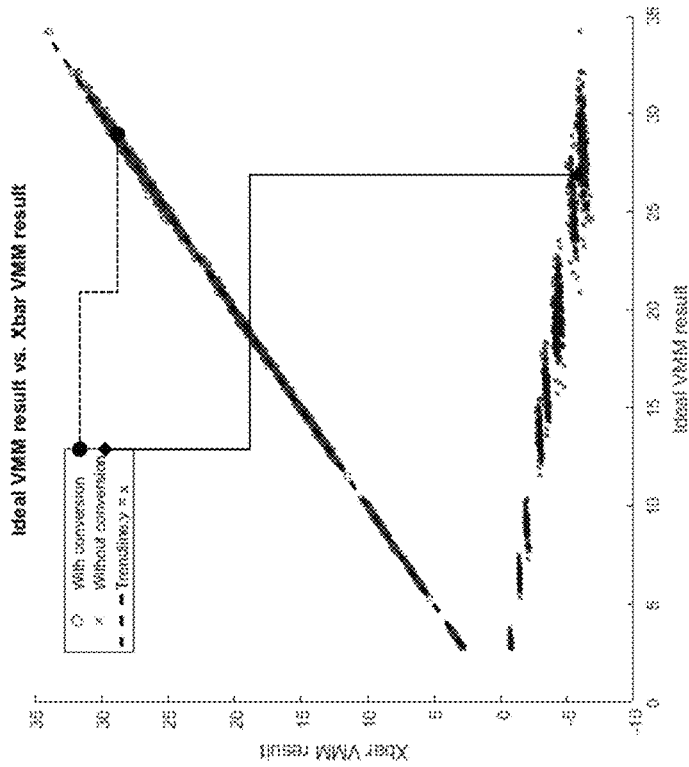
FIG. 5B is a chart illustrating crossbar VMM result versus ideal VMM result in the 128×128 crossbar array circuit with Rout=100 ohm.
Figure 5A:
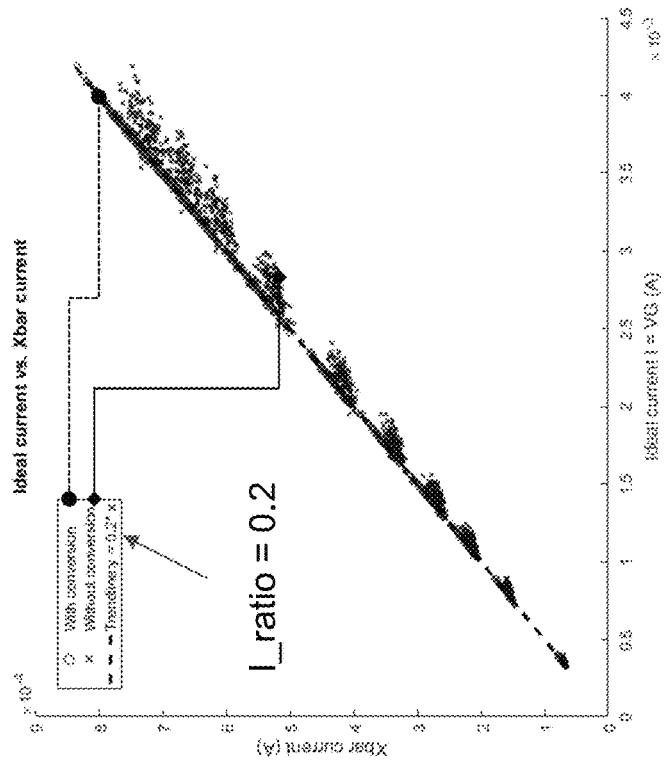
FIG. 5A is a chart illustrating crossbar output current versus ideal output current across memristor devices in a 128×128 crossbar array circuit with Rout=100 ohm.

FIG. 5A is a current chart 5000 illustrating crossbar output current versus ideal output current across memristor devices in a 128×128 crossbar array circuit with Rout=100 ohm. After simulation, a ratio r=0.2 that linearly fits the line y=a*x+b is found. The ration means the percentage of ideal current each cross-point device should pass. It may be fixed by set r to be smaller than 0.2, such as 0.18.

Moreover, from the simulation with and without conversion algorithm, it is found that it is much easier to linearly fit a line with a conversion algorithm than without a conversion algorithm. Meanwhile, since the voltage across Rout is 0.8 mA*100 ohm=80 mV, the ADC in this crossbar array circuit should be able to read an 80 mV signal.

FIG. 5B is a VMM result chart 5100 illustrating crossbar VMM result versus ideal VMM result in the 128×128 crossbar array circuit with Rout=100 ohm. It also shows that it is much easier to linearly fit a line with a conversion algorithm than without a conversion algorithm.

Figure 5C:
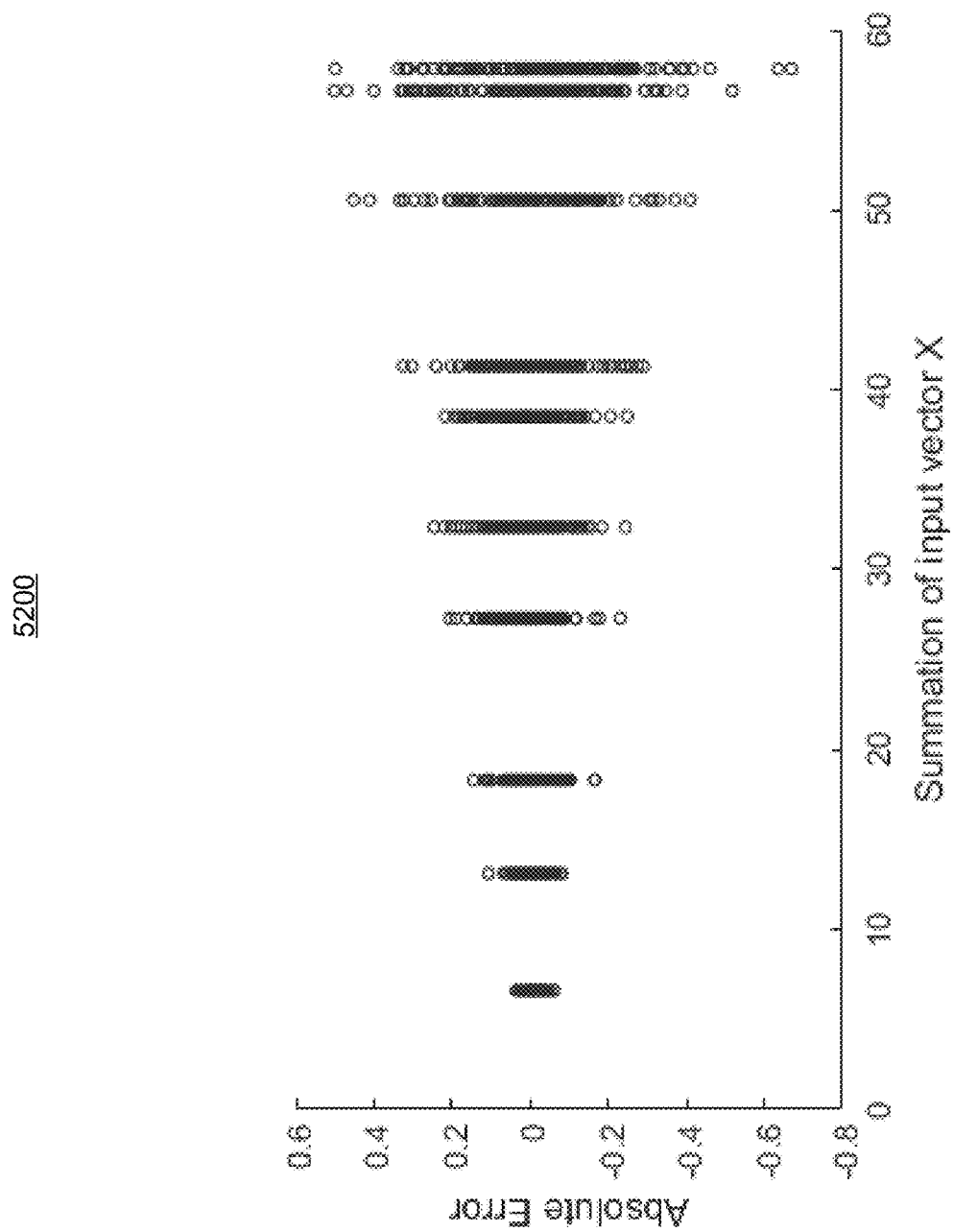
FIG. 5C is an error pattern illustrating errors between VMM result versus input vector in the 128×128 crossbar array circuit with Rout=100 ohm.

FIG. 5C is an error pattern 5200 illustrating errors between VMM result versus input vector in the 128×128 crossbar array circuit with Rout=100 ohm. The summation of the input vector is between 0 and 60 while the error is between −1 and 1. This means that it is within 6 bits precision.

Figure 5D:
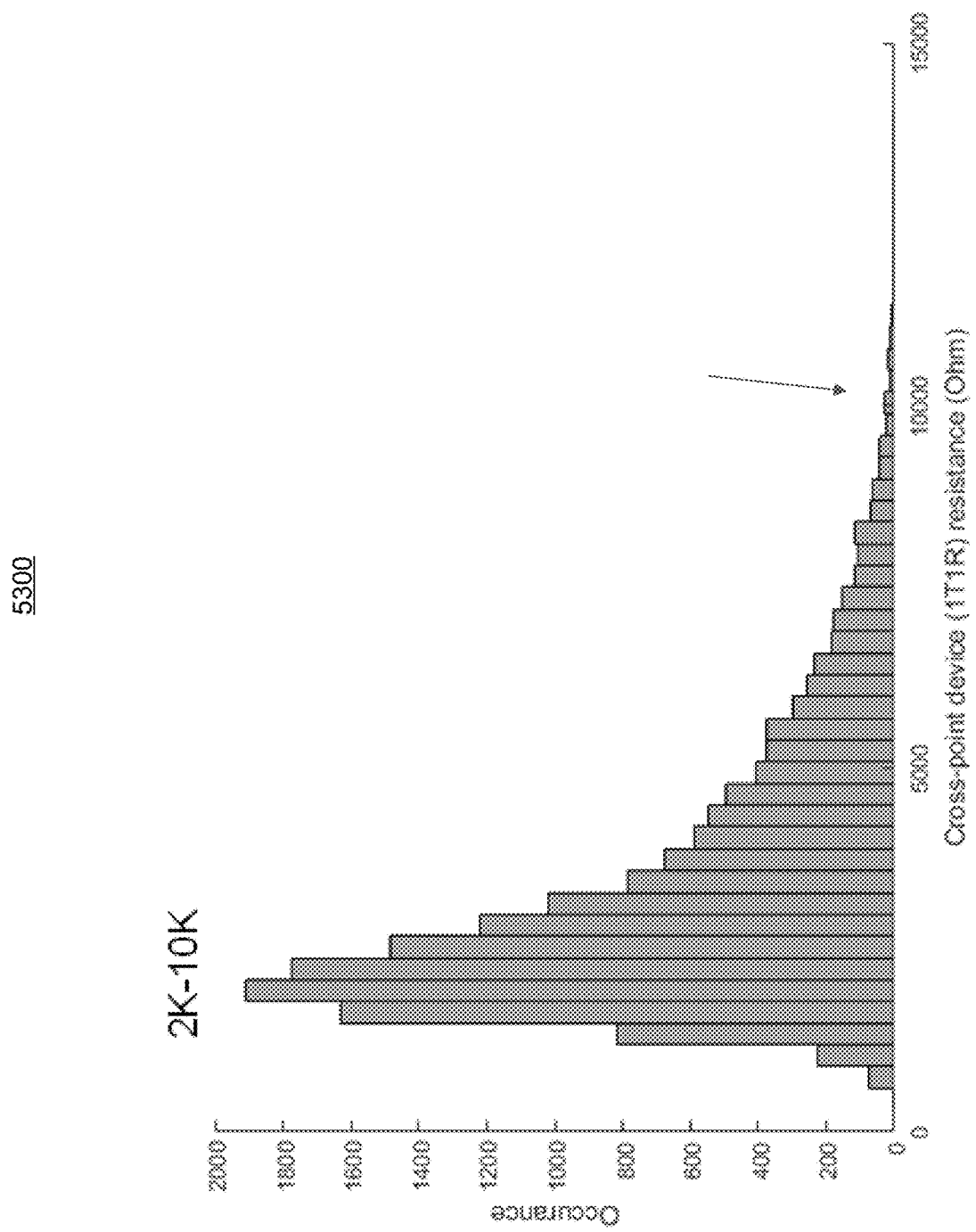
FIG. 5D is a resistance chart illustrating the distribution of resistances after performing VMM using the conversion algorithm.

FIG. 5D is a resistance chart 5300 illustrating the distribution of resistances after performing VMM using the conversion algorithm. As shown in FIG. 5D, the crossbar array under the simulation parameters requires some cross-point devices to be larger than 10K ohm.

Figure 6B:
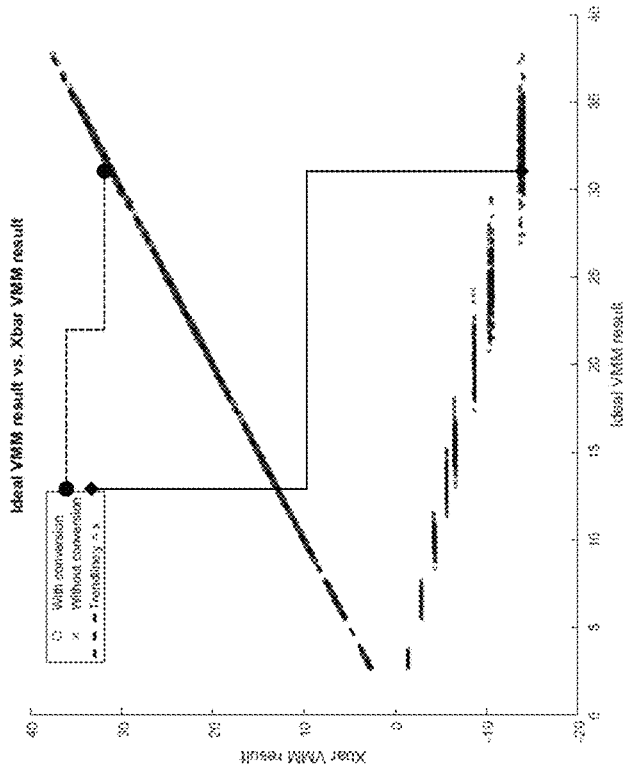
FIG. 6B is a VMM result chart illustrating crossbar VMM result versus ideal VMM result in the 128×128 crossbar array circuit with Rout=500 ohm.
Figure 6A:
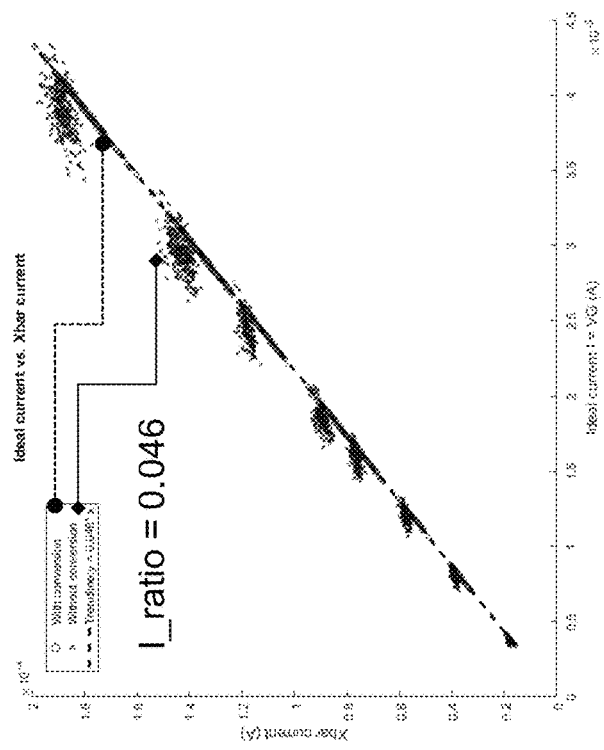
FIG. 6A is a current chart illustrating crossbar output current versus ideal output current across memristor devices in a 128×128 crossbar array circuit with Rout=500 ohm.

FIG. 6A is a current chart 6000 illustrating crossbar output current versus ideal output current across memristor devices in a 128×128 crossbar array circuit with Rout=500 ohm. After simulation, a ratio r=0.046 that linearly fits the line y=a*x+b is found. The ration means the percentage of ideal current each cross-point device should pass. Since the voltage across Rout is 0.2 mA*500 ohm=100 mV, the ADC in this crossbar array circuit should be able to read a 100 mV signal.

FIG. 6B is a VMM result chart 6100 illustrating crossbar VMM result versus ideal VMM result in the 128×128 crossbar array circuit with Rout=500 ohm.

Figure 6C:
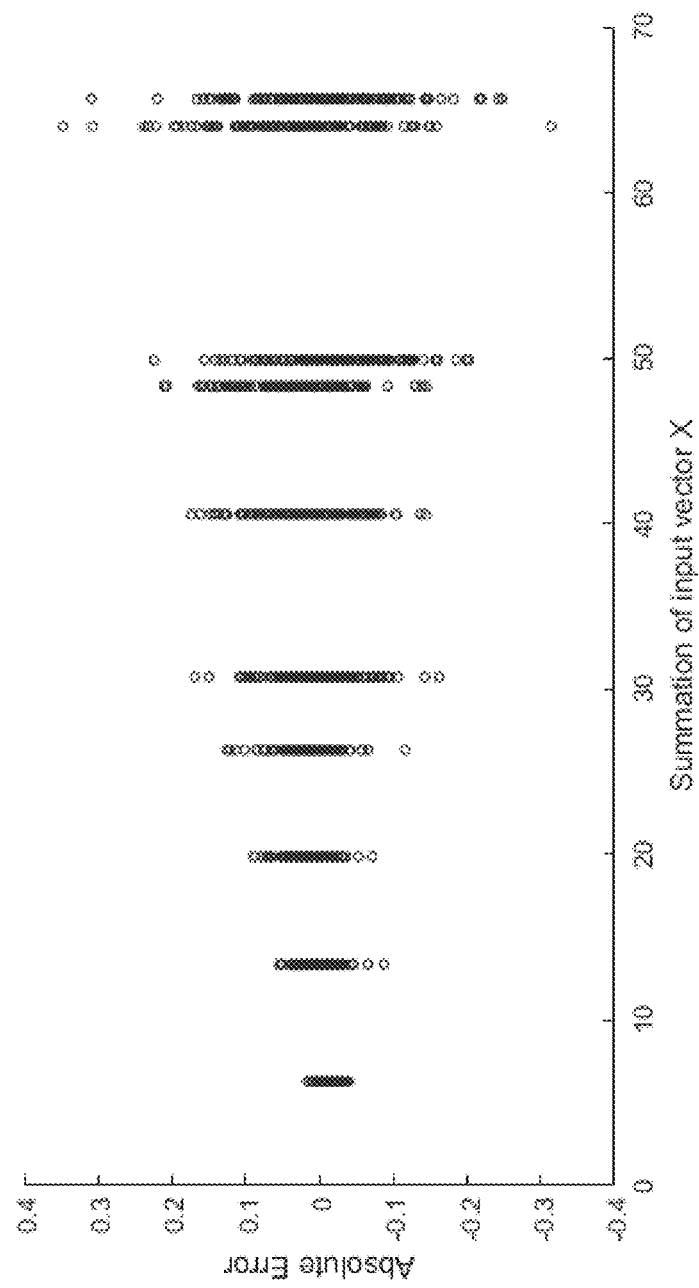
FIG. 6C is an error pattern illustrating errors between VMM result versus input vector in the 128×128 crossbar array circuit with Rout=500 ohm.

FIG. 6C is an error pattern 6200 illustrating errors between VMM result versus input vector in the 128×128 crossbar array circuit with Rout=500 ohm.

Figure 6D:
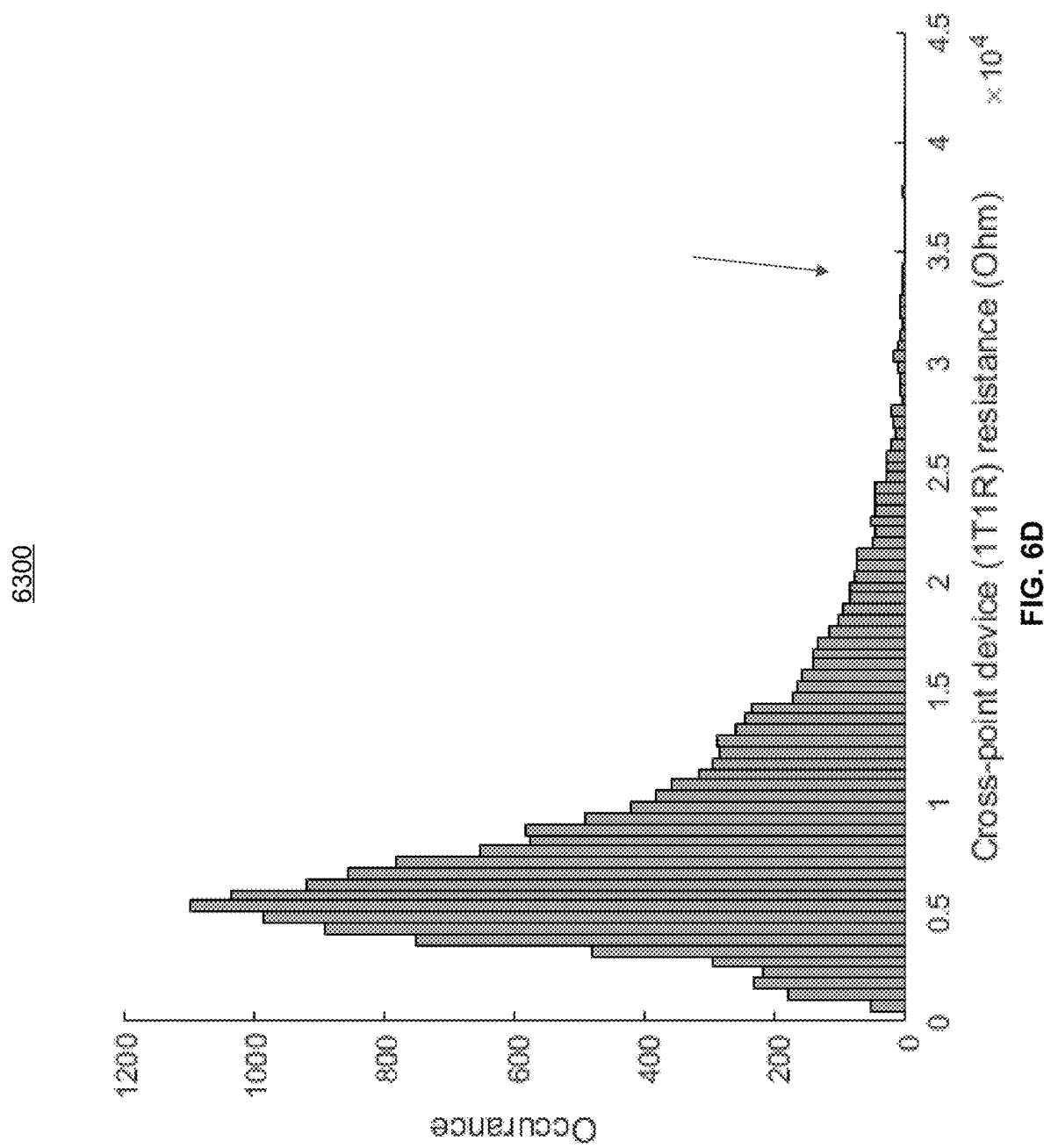
FIG. 6D is a resistance chart illustrating the distribution of resistances after performing VMM using the conversion algorithm.

FIG. 6D is a resistance chart 6300 illustrating the distribution of resistances after performing VMM using a conversion algorithm. As shown in FIG. 6D, the crossbar array under the simulation parameters requires some cross-point devices to be larger than 35K ohm, which is still physically achievable. However, as Rout increases, the distribution of resistance of the cross-point device must become wider to compensate for the loss of dynamic range due to Rout. By using a conversion algorithm or other algorithms, it explores the whole resistance space to find a solution. Sometimes it would give some cross-point device very resistive, or not be able to find a solution within error tolerance.

Figure 7B:
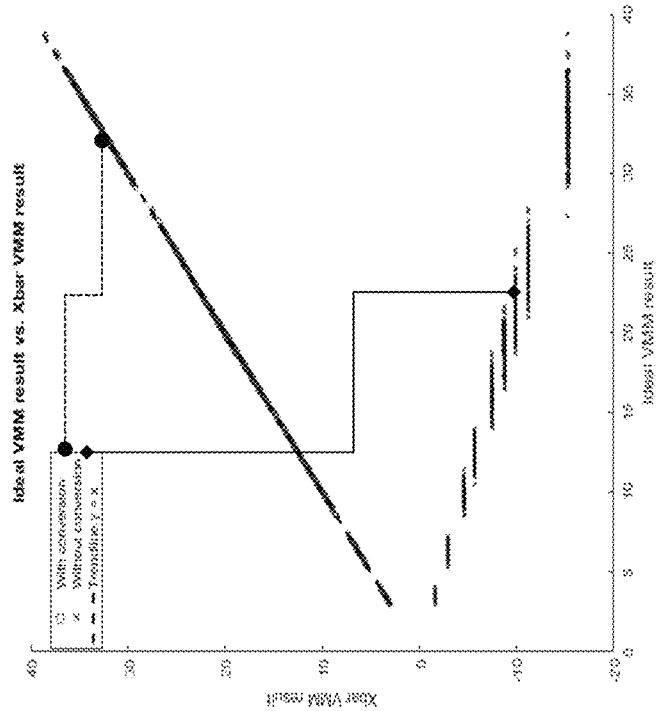
FIG. 7B is a VMM result chart illustrating crossbar VMM result versus ideal VMM result in the 128×128 crossbar array circuit with Rout=1000 ohm.
Figure 7A:
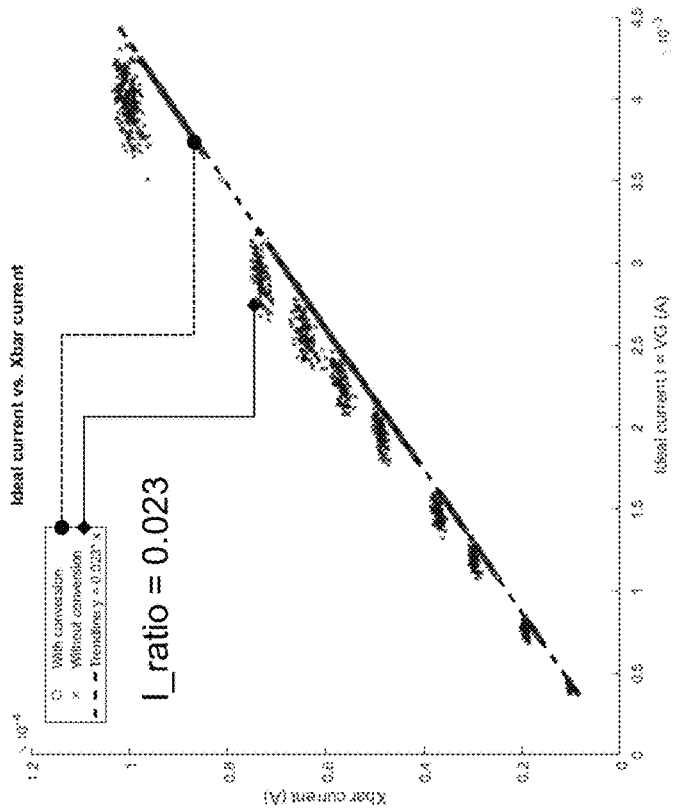
FIG. 7A is a current chart illustrating crossbar output current versus ideal output current across memristor devices in a 128×128 crossbar array circuit with Rout=1000 ohm.

FIG. 7A is a current chart 7000 illustrating crossbar output current versus ideal output current across memristor devices in a 128×128 crossbar array circuit with Rout=1000 ohm. After simulation, a ratio r=0.023 that linearly fits the line y=a*x+b is found. Since the voltage across Rout is 0.12 mA*1000 ohm=120 mV, the ADC in this crossbar array circuit should be able to read a 120 mV signal.

FIG. 7B is a VMM result chart 7100 illustrating crossbar VMM result versus ideal VMM result in the 128×128 crossbar array circuit with Rout=1000 ohm.

Figure 7C:
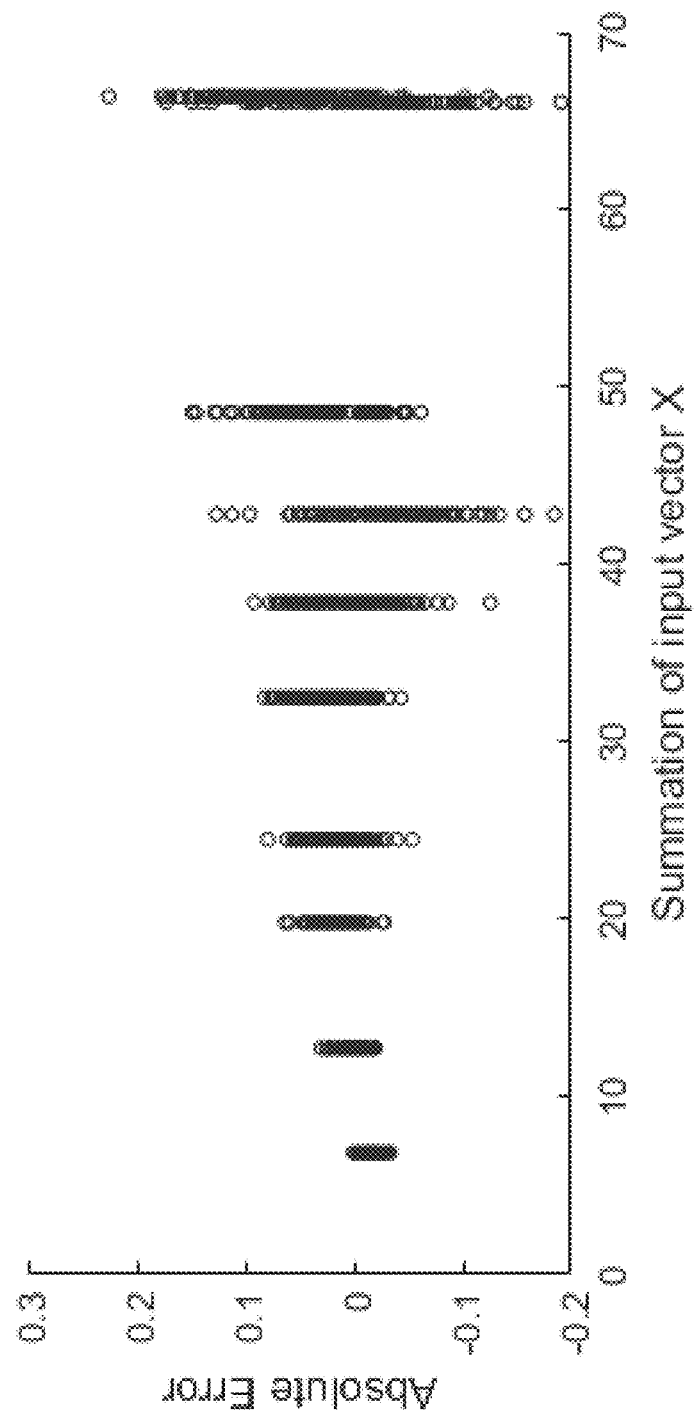
FIG. 7C is an error pattern illustrating errors between VMM result versus input vector in the 128×128 crossbar array circuit with Rout=1000 ohm.

FIG. 7C is an error pattern 7200 illustrating errors between VMM result versus input vector in the 128×128 crossbar array circuit with Rout=1000 ohm.

Figure 7D:
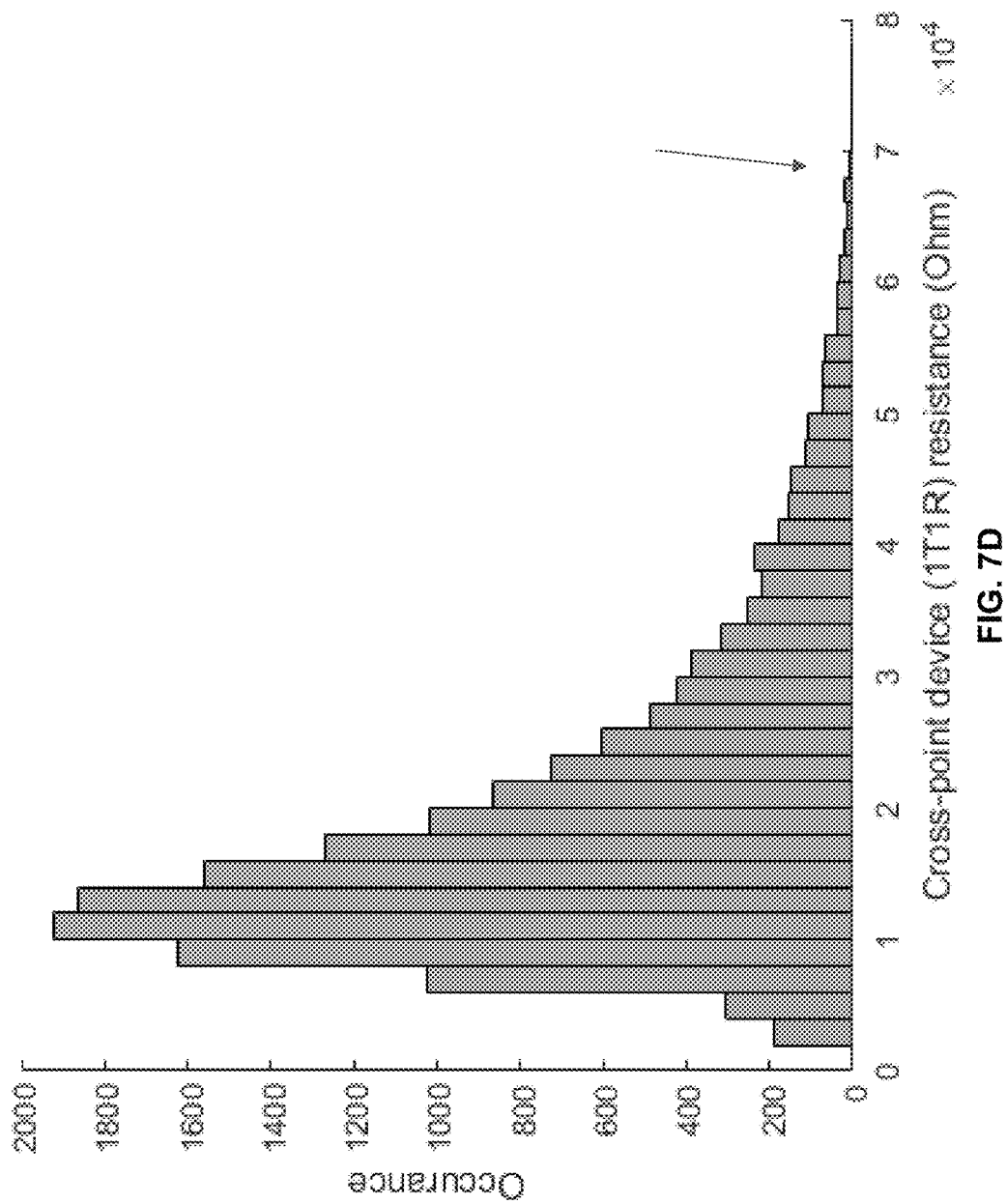
FIG. 7D is a resistance chart illustrating the distribution of resistances after performing VMM using the conversion algorithm.

FIG. 7D is a resistance chart 7300 illustrating the distribution of resistances after performing VMM using a conversion algorithm. As shown in FIG. 7D, the crossbar array under the simulation parameters requires some cross-point devices to be larger than 70K ohm, which is still physically achievable.

Figure 8B:
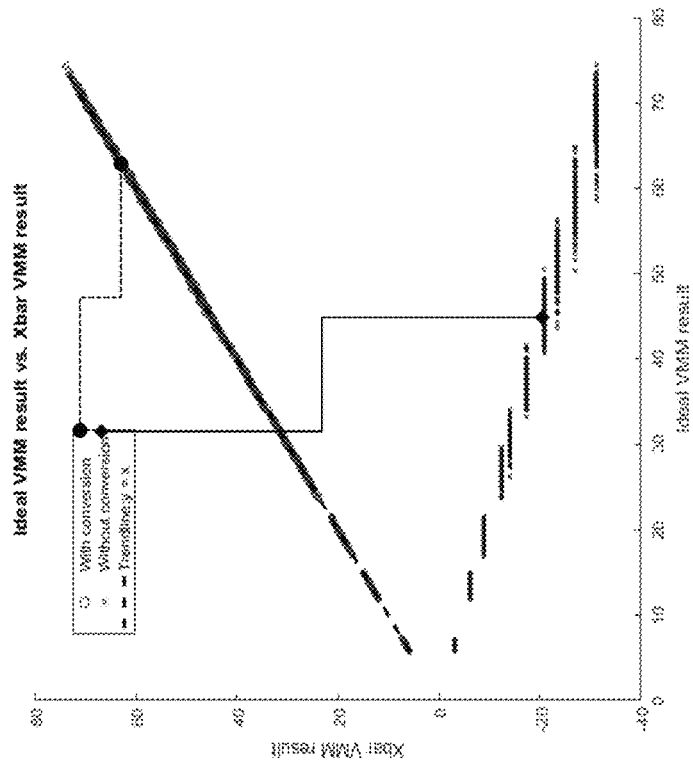
FIG. 8B is a VMM result chart illustrating crossbar VMM result versus ideal VMM result in the 256×256 crossbar array circuit with Rout=500 ohm.
Figure 8A:
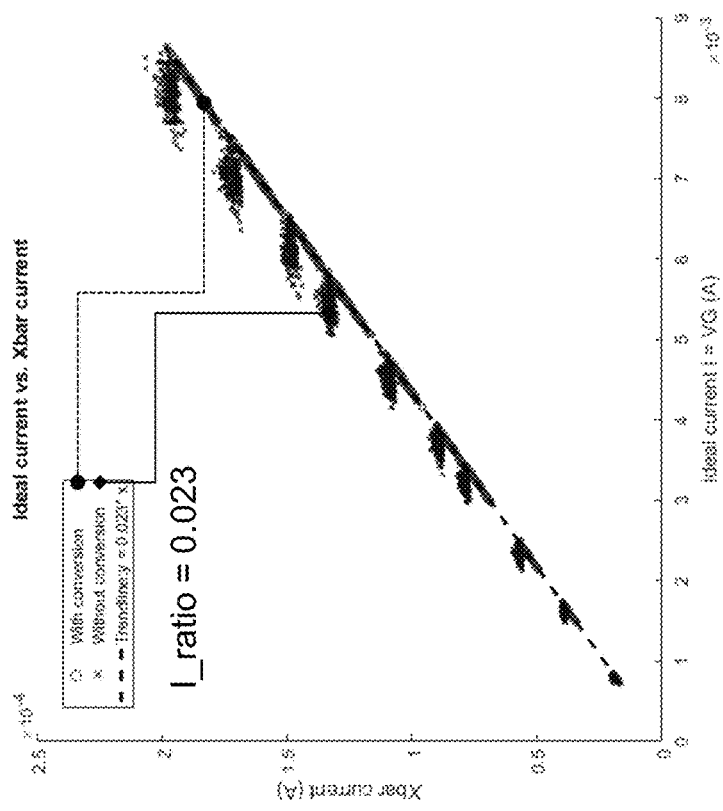
FIG. 8A is a current chart illustrating crossbar output current versus ideal output current across memristor devices in a 256×256 crossbar array circuit with Rout=500 ohm.

FIG. 8A is a current chart 8000 illustrating crossbar output current versus ideal output current across memristor devices in a 256×256 crossbar array circuit with Rout=500 ohm. After simulation, a ratio r=0.023 that linearly fits the line y=a*x+b is found.

FIG. 8B is a VMM result chart 8100 illustrating crossbar VMM result versus ideal VMM result in the 256×256 crossbar array circuit with Rout=500 ohm.

Figure 8C:
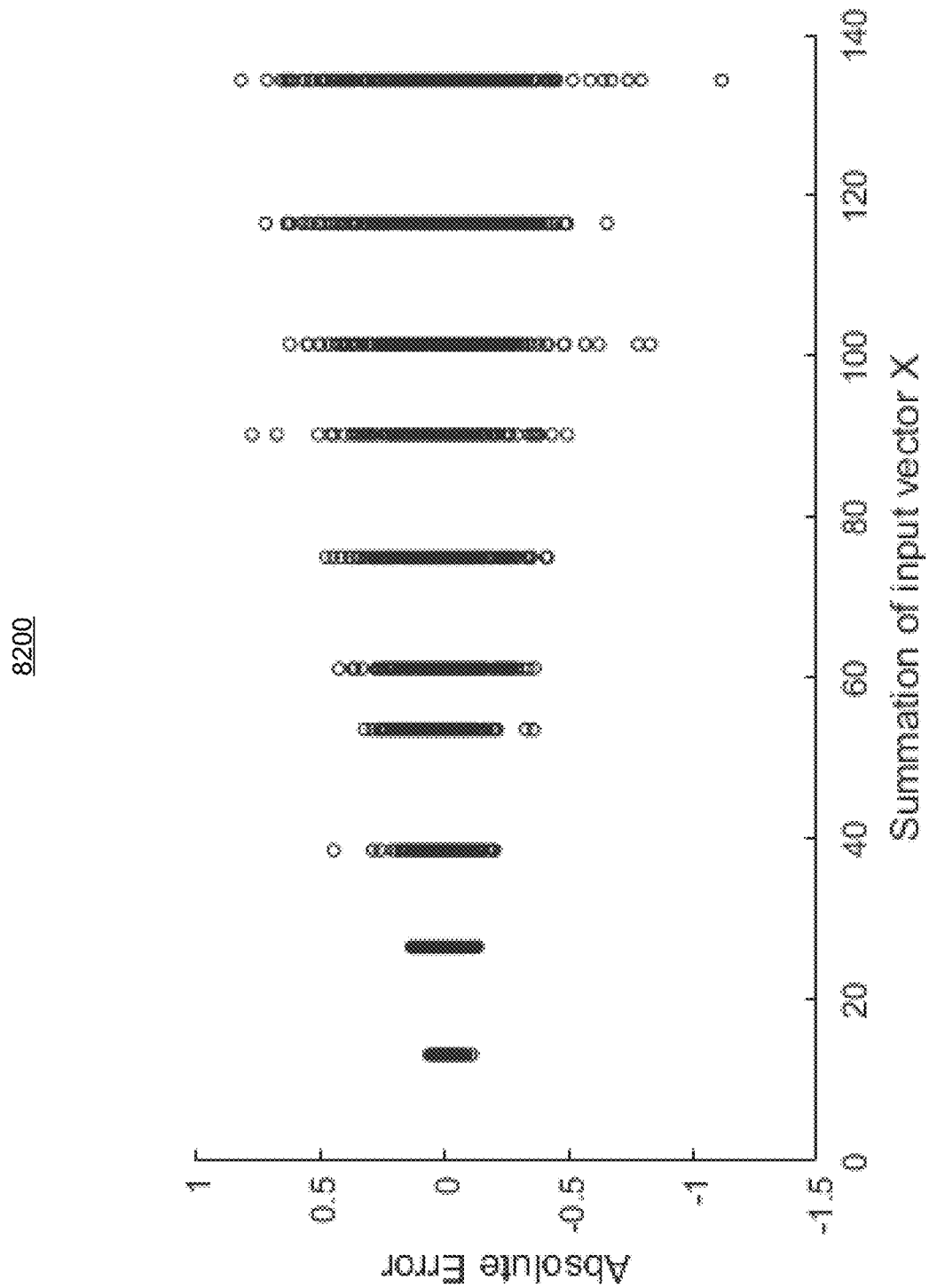
FIG. 8C is an error pattern illustrating errors between VMM result versus input vector in the 256×256 crossbar array circuit with Rout=500 ohm.

FIG. 8C is an error pattern 8200 illustrating errors between VMM result versus input vector in the 256×256 crossbar array circuit with Rout=500 ohm.

Figure 8D:
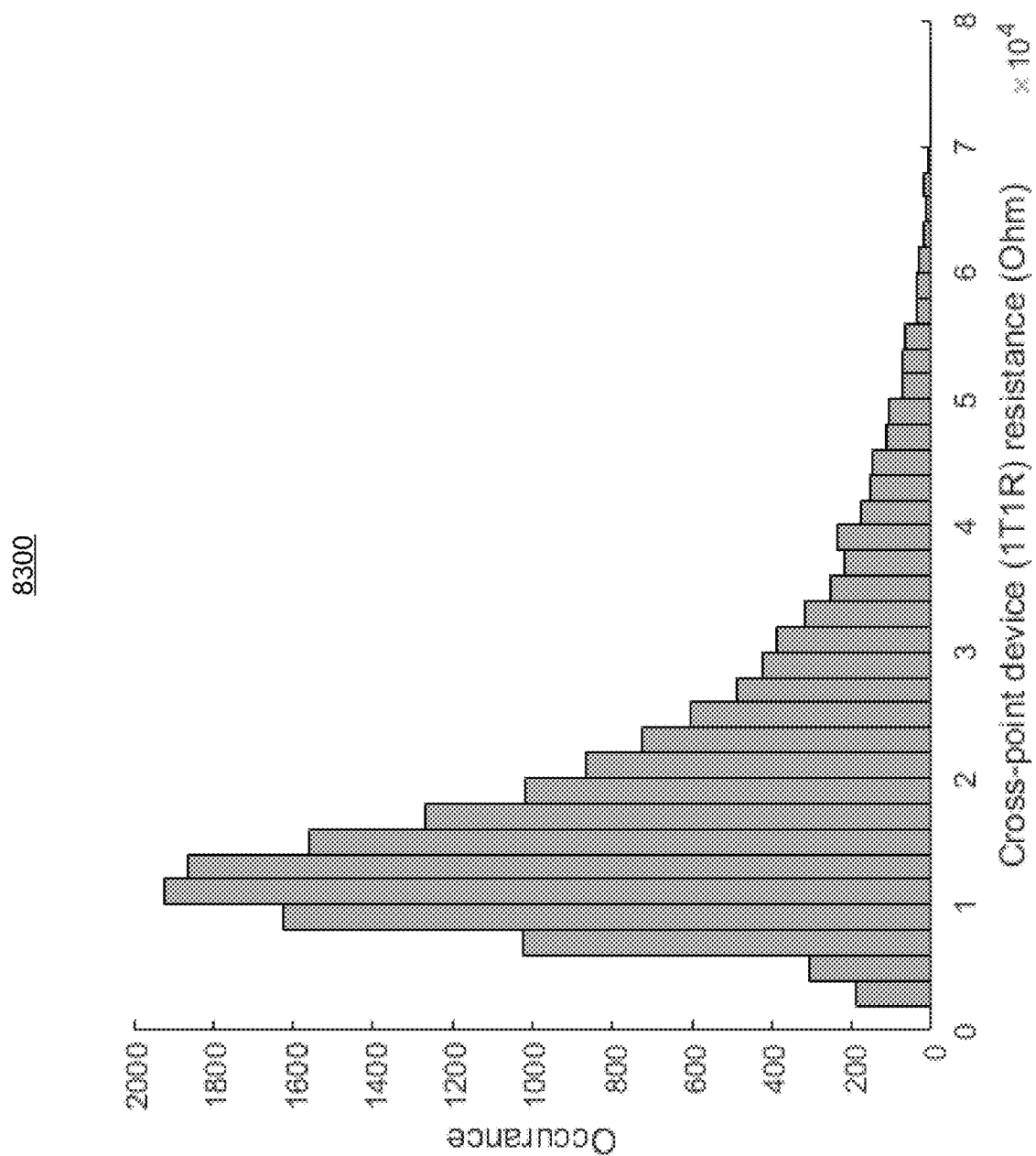
FIG. 8D is a resistance chart illustrating the distribution of resistances after performing VMM using the conversion algorithm.

FIG. 8D is a resistance chart 8300 illustrating the distribution of resistances after performing VMM using the conversion algorithm. As shown in FIG. 8D, the crossbar array under the simulation parameters requires some cross-point devices to be larger than 70K ohm, which is still physically achievable.

Figure 9B:
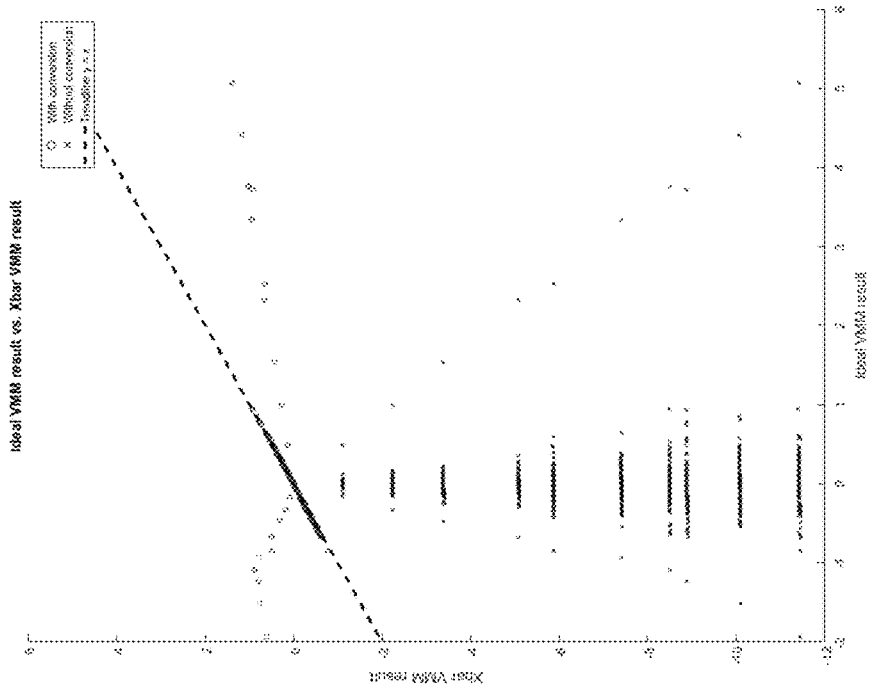
FIG. 9B is a VMM result chart illustrating crossbar VMM result versus ideal VMM result in the 128×128 crossbar array circuit with Rout=1000 ohm and DCT mapping.
Figure 9A:
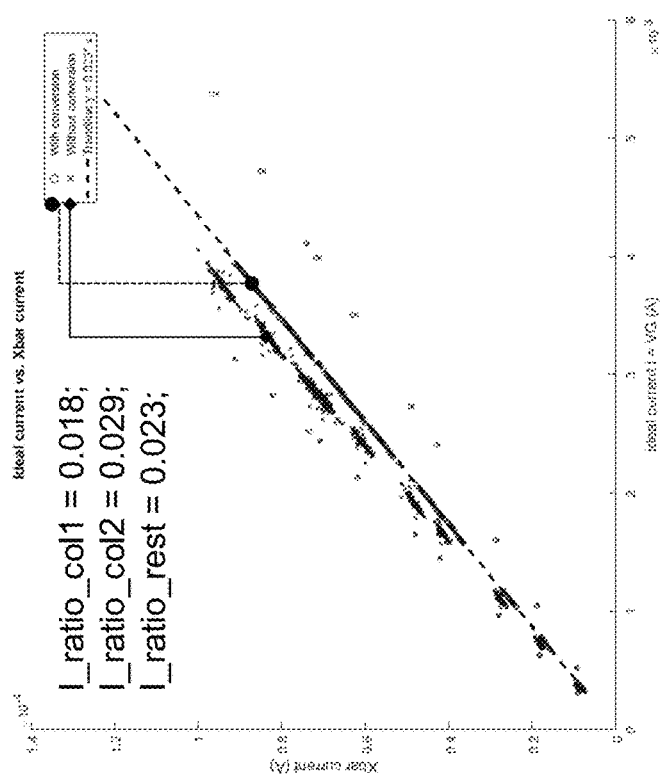
FIG. 9A is a current chart illustrating crossbar output current versus ideal output current across memristor devices in a 128×128 crossbar array circuit with Rout=1000 ohm and DCT mapping.

FIG. 9A is a current chart 9000 illustrating crossbar output current versus ideal output current across memristor devices in a 128×128 crossbar array circuit with Rout=1000 ohm and DCT mapping. After the simulation, it is found that there are different output current trajectories. There is no single ratio that will fit for all cross-point devices. It is also found that because each column has a huge ratio difference, different ratios for different columns are needed, especially those columns with very different weight patterns. As shown in FIG. 9A, at least three ratios can be found in this simulation: I_ratio_col1=0.018, I_ratio_col2=0.029, and I_ratio_col3=0.023.

FIG. 9B is a VMM result chart 9100 illustrating crossbar VMM result versus ideal VMM result in the 128×128 crossbar array circuit with Rout=1000 ohm and DCT mapping.

Figure 9C:
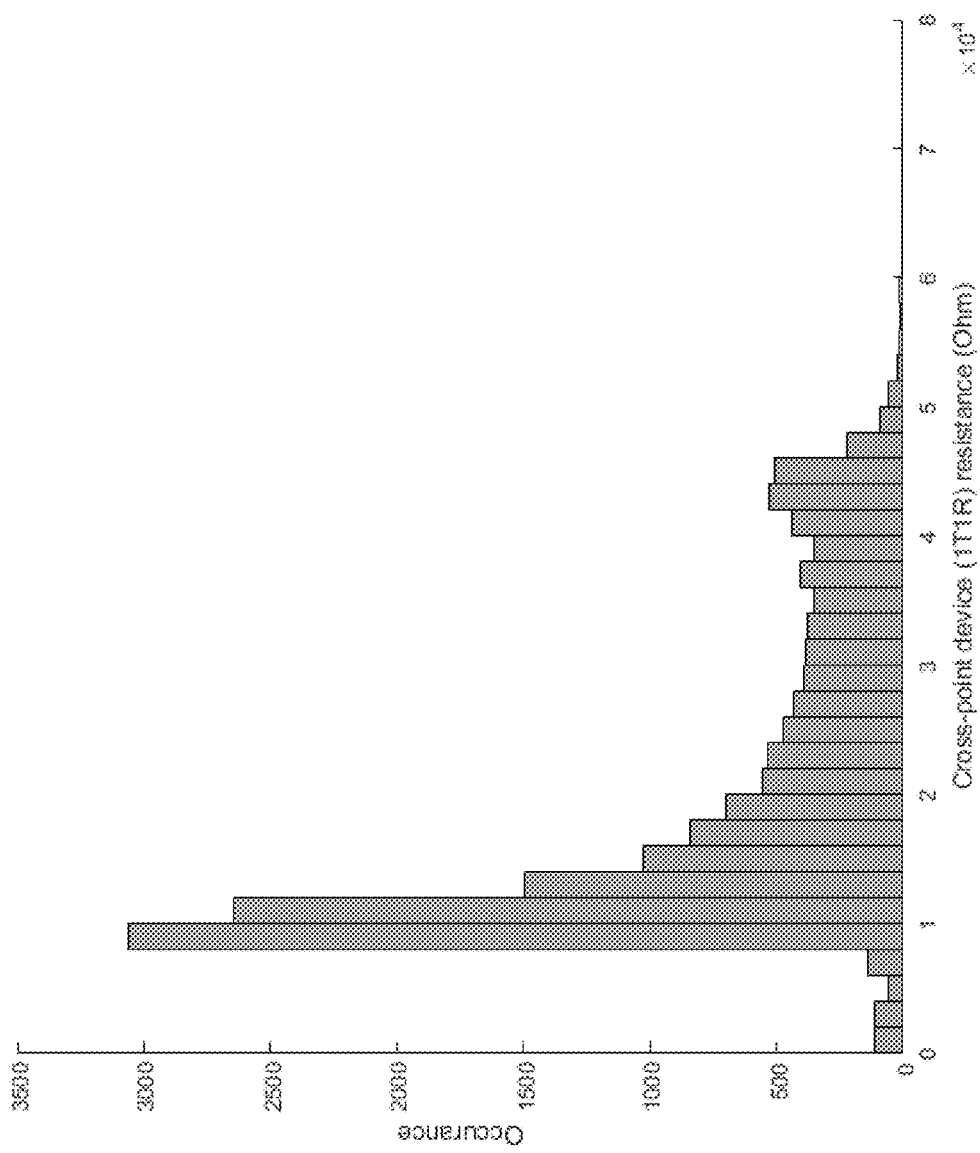
FIG. 9C is a resistance chart illustrating the distribution of resistances after performing VMM using the conversion algorithm.

FIG. 9C is a resistance chart 9200 illustrating the distribution of resistances after performing VMM using the conversion algorithm.

Figures 10A, 10B:
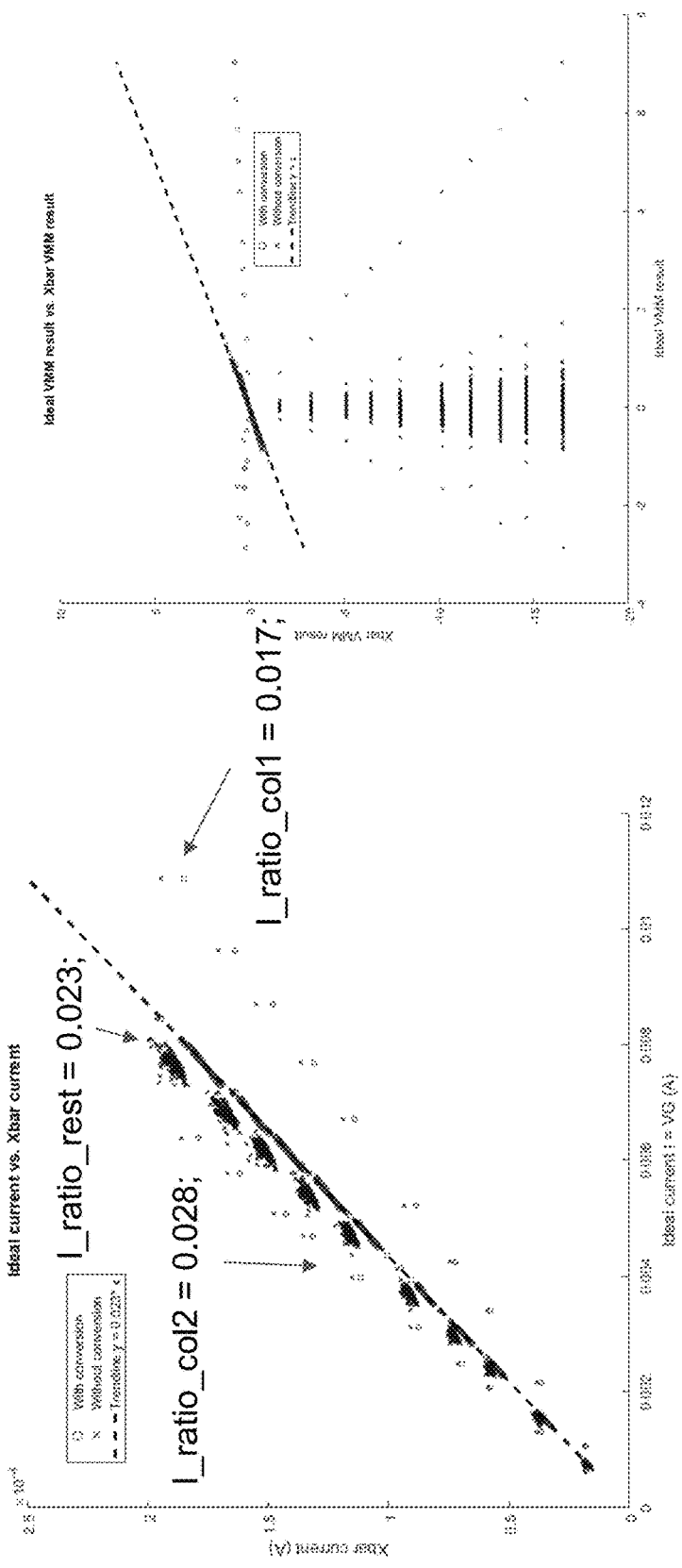
FIG. 10A is a current chart illustrating crossbar output current versus ideal output current across memristor devices in a 256×256 crossbar array circuit with Rout=500 ohm and DCT mapping.
FIG. 10B is a VMM result chart illustrating crossbar VMM result versus ideal VMM result in the 256×256 crossbar array circuit with Rout=500 ohm and DCT mapping.

FIG. 10A is a current chart 10000 illustrating crossbar output current versus ideal output current across memristor devices in a 256×256 crossbar array circuit with Rout=500 ohm and DCT mapping. As shown in FIG. 10A, at least three ratios can be found in this simulation: I_ratio_col1=0.023, I_ratio_col2=0.028, and I_ratio_col3=0.017.

FIG. 10B is a VMM result chart 10100 illustrating crossbar VMM result versus ideal VMM result in the 256×256 crossbar array circuit with Rout=500 ohm and DCT mapping.

FIG. 10C is an error pattern 10200 illustrating errors between VMM result versus input vector in the 256×256 crossbar array circuit with Rout=500 ohm and DCT mapping.

Figure 10D:
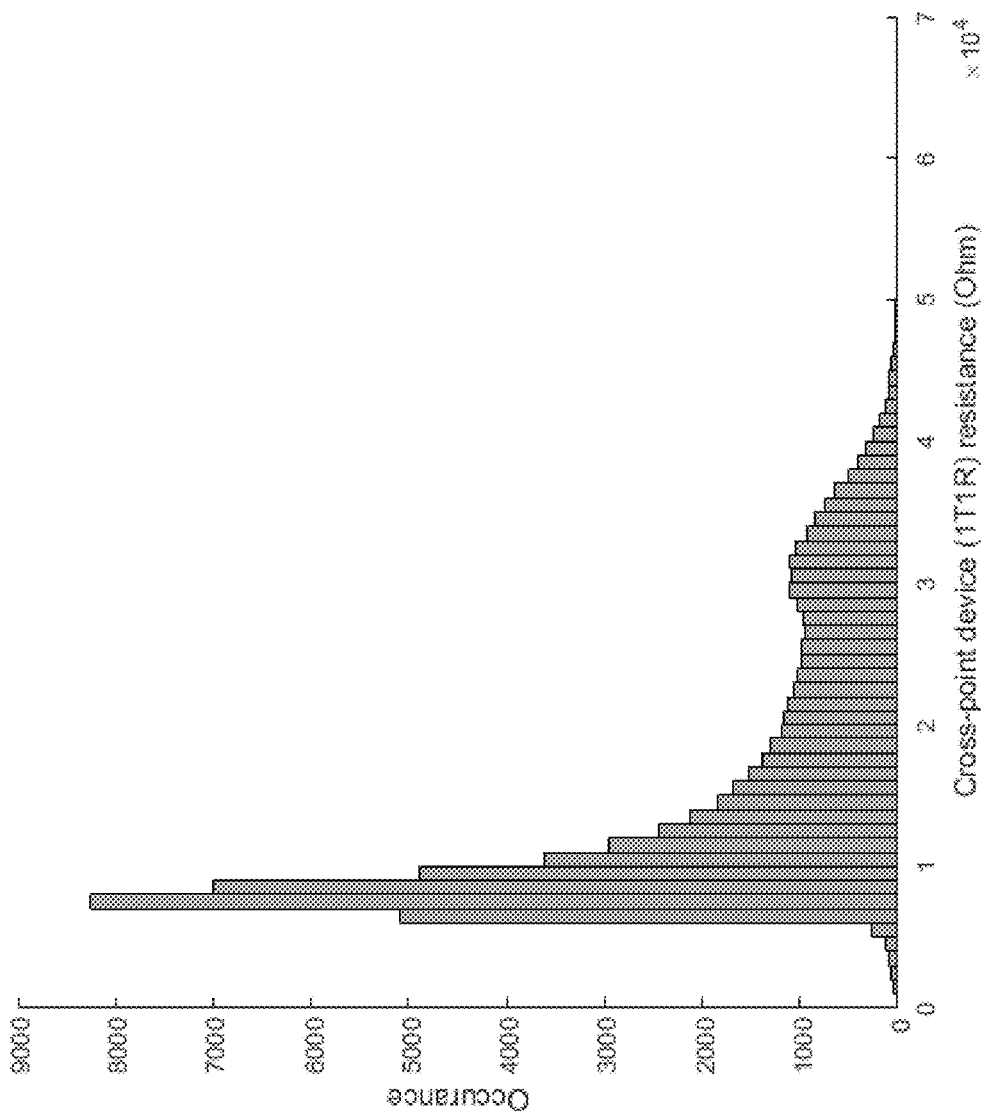
FIG. 10D is a resistance chart illustrating the distribution of resistances after performing VMM using the conversion algorithm.

FIG. 10D is a resistance chart 10300 illustrating the distribution of resistances after performing VMM using the conversion algorithm.

Figure 11B:
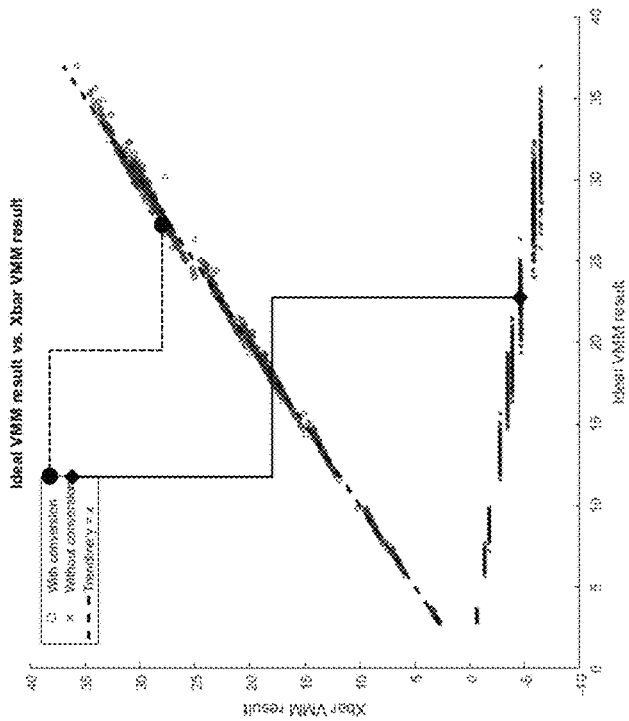
FIG. 11B is a VMM result chart illustrating crossbar VMM result versus ideal VMM result in the 128×128 crossbar array circuit with Rout=1000 ohm and Ron decreases from 2K ohm to 1K ohm.
Figure 11A:
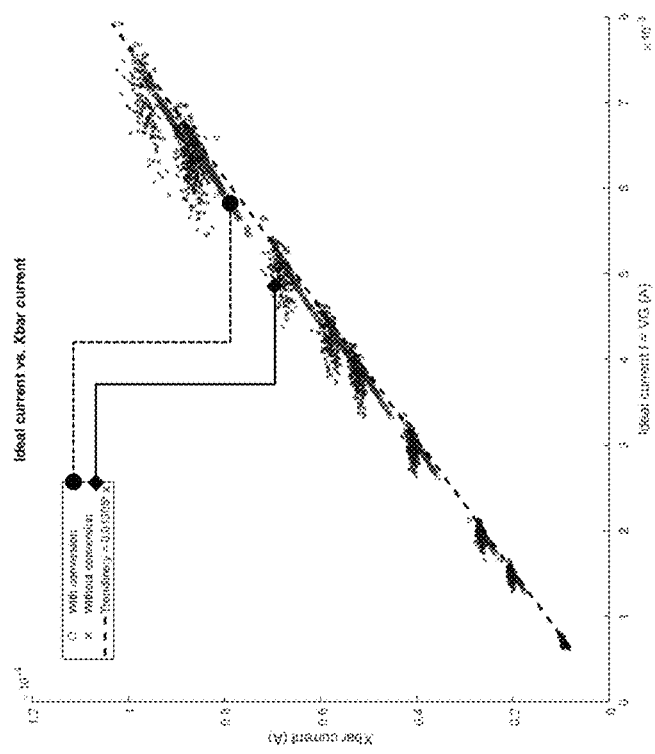
FIG. 11A is a current chart illustrating crossbar output current versus ideal output current across memristor devices in a 128×128 crossbar array circuit with Rout=1000 ohm and Ron decreases from 2K ohm to 1K ohm.

FIG. 11A is a current chart 11000 illustrating crossbar output current versus ideal output current across memristor devices in a 128×128 crossbar array circuit with Rout=1000 ohm and Ron decreases from 2K ohm to 1K ohm. Because ideally, Ron decreases is equivalent to Rout increase, this simulation is intended to see whether Ron decreases may gain the benefit as added large Rout does. As shown in FIG. 11A, it shows a similar benefit as added large Rout. Therefore, this may be the same mechanism as to the added large Rout with algorithms in accordance with some implementations of the present disclosure.

FIG. 11B is a VMM result chart 11100 illustrating crossbar VMM result versus ideal VMM result in the 128×128 crossbar array circuit with Rout=1000 ohm and Ron decreases from 2K ohm to 1K ohm.

Figure 11C:
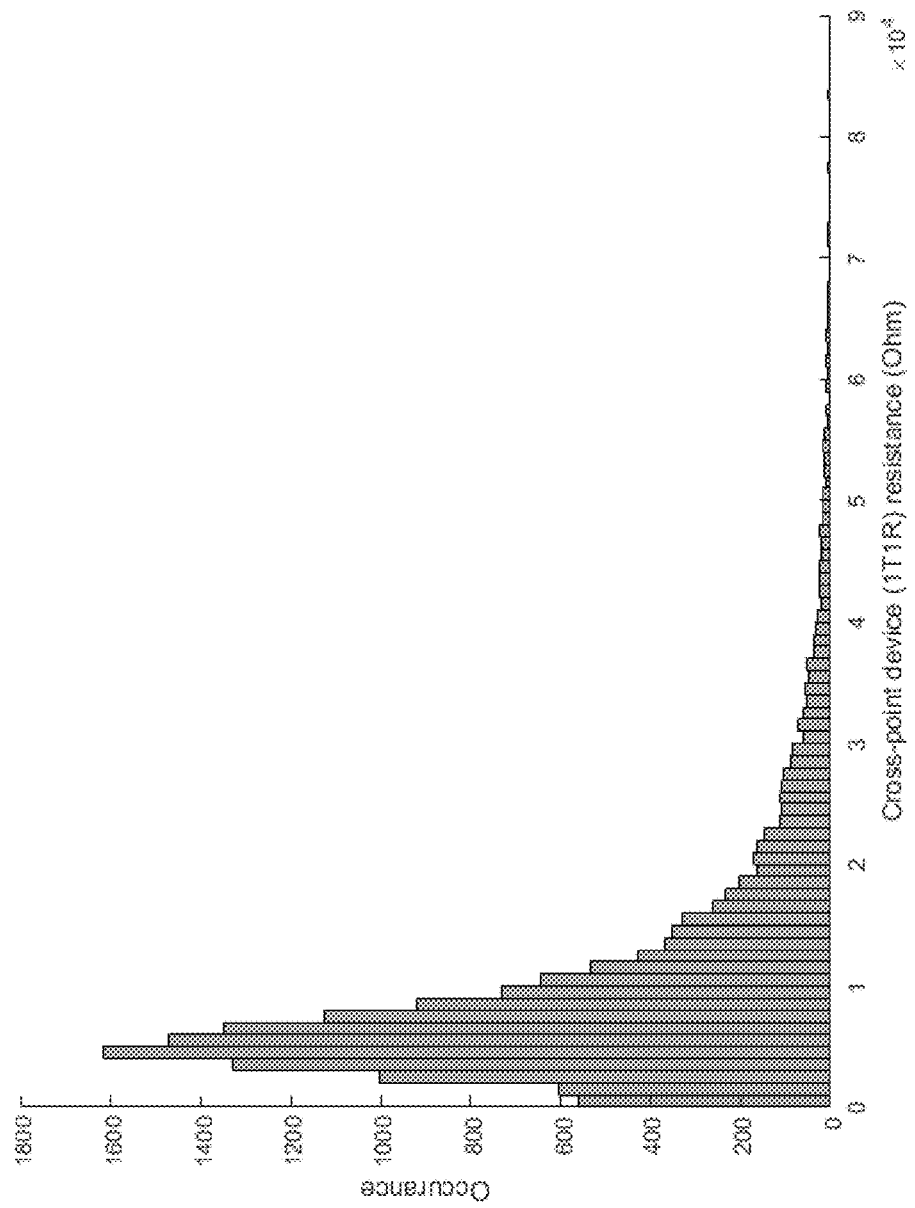
FIG. 11C is a resistance chart illustrating the distribution of resistances after performing VMM using the conversion algorithm.

FIG. 11C is a resistance chart 11200 illustrating the distribution of resistances after performing VMM using the conversion algorithm.

Figure 12:
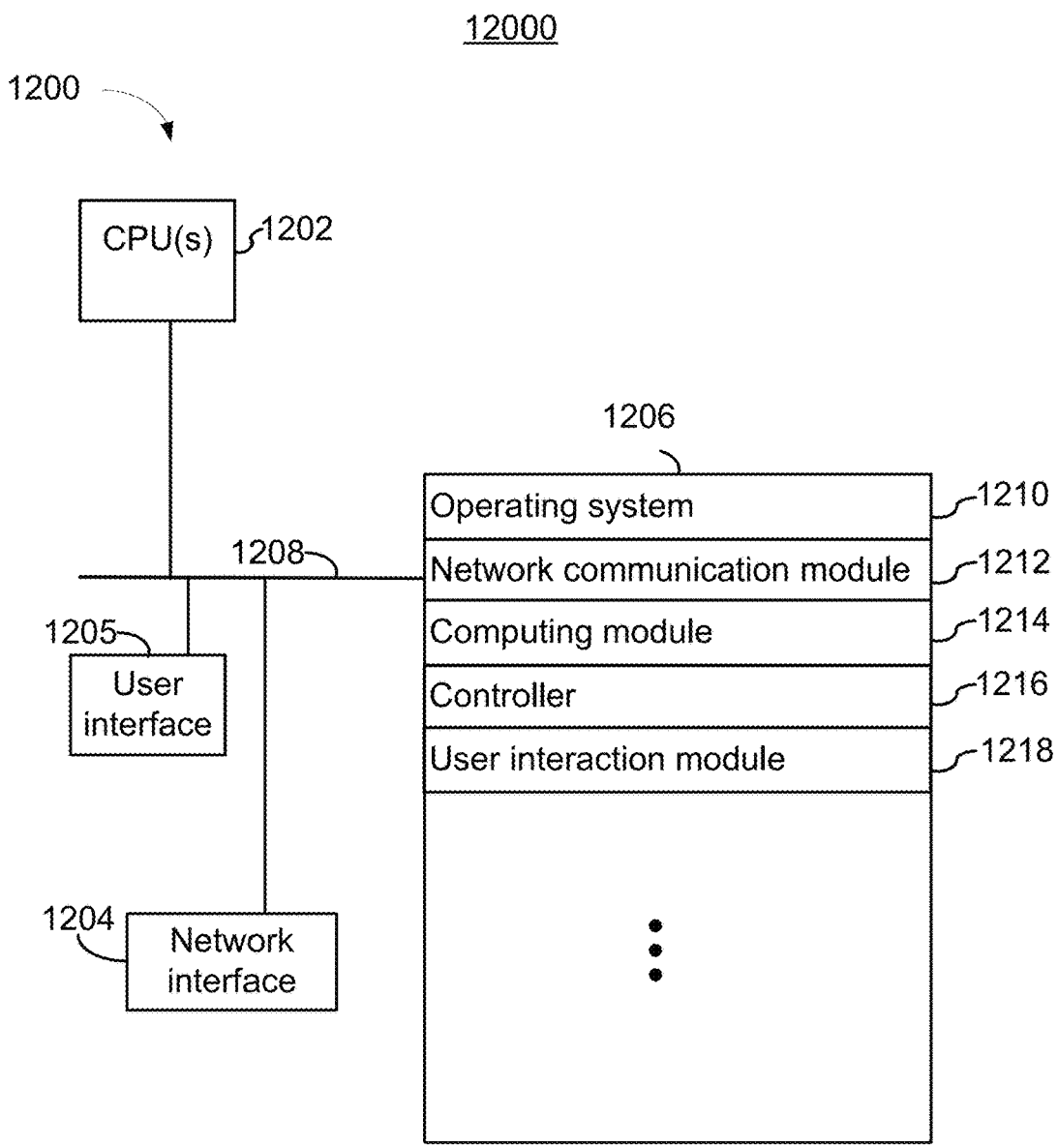
FIG. 12 is a block diagram illustrating an example computing system for implementing methods of using large output resistance to reduce the current in a crossbar array circuit in accordance with some implementations.

FIG. 12 is a block diagram 12000 illustrating an example computing system 1200 for implementing methods for reducing current in a crossbar array circuit using large output resistance in accordance with some implementations. The computer system 1200 may be used to at least the crossbars or crossbar arrays in accordance with some implementations of the present disclosure. The computer system 1200 in some implementations includes one or more processing units CPU(s) 1202 (also referred to as processors), one or more network interfaces 1205, optionally a user interface, a memory 1206, and one or more communication buses 1208 for interconnecting these components. The communication buses 1208 optionally include circuitry (sometimes called a chipset) that interconnects and controls communications between system components. The memory 1206 typically includes high-speed random access memory, such as DRAM, SRAM, DDR RAM or other random access solid-state memory devices; and optionally includes non-volatile memory, such as one or more magnetic disk storage devices, optical disk storage devices, flash memory devices, or other non-volatile solid-state storage devices. The memory 1206 optionally includes one or more storage devices remotely located from the CPU(s) 1202. The memory 1206, or alternatively the non-volatile memory device(s) within the memory 1206, includes a non-transitory computer-readable storage medium. In some implementations, the memory 1206 or alternatively the non-transitory computer-readable storage medium stores the following programs, modules, and data structures, or a subset thereof:

- an operating system 1210 (e.g., an embedded Linux operating system), which includes procedures for handling various basic system services and for performing hardware dependent tasks;
- a network communication module 1212 for connecting the computer system with a manufacturing machine via one or more network interfaces (wired or wireless);
- a computing module 1214 for executing programming instructions;
- a controller 1216 for controlling a manufacturing machine in accordance with the execution of programming instructions; and
- a user interaction module 1218 for enabling a user to interact with the computer system 1200.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first column could be termed a second column, and, similarly, a second column could be termed the first column, without changing the meaning of the description, so long as all occurrences of the "first column" are renamed consistently and all occurrences of the "second column" are renamed consistently. The first column and the second are columns both column s, but they are not the same column.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures, and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method of simulating a crossbar array circuit having a crossbar array, comprising steps of:
   S1. testing the crossbar array;
   S2. calibrating a simulation model;
   S3. simulating the crossbar array with the simulation model, wherein a simulation result is generated after the S3;
   S4. determining a fixed ratio of ideal current from the simulation result;
   S5. adjusting conductance mapping value to let the crossbar array pass the fixed ratio of ideal current and generating a conductance matrix;
   S6. programming the conductance matrix to the crossbar array;
   S7. passing an input signal to the crossbar array and generating a computing result; and
   S8. checking the quality of computing results; if the computing results are qualified, transmitting the computing results; if the computing results are not qualified, adjusting the conductance mapping value with consideration of programming errors and defects, and returning to S5.

2. The method as claimed in claim 1, wherein the crossbar array circuit further comprises:
   one or many of cross-point devices;
   an output resistance $R_{out}$ connected to the crossbar array; and
   an ADC configured to receive signals from the crossbar array.

3. The method as claimed in claim 1, wherein the crossbar array circuit further comprises:
   one or many of cross-point devices;
   an output resistance connected to the crossbar array;
   a TIA connected to the output resistance; and
   an ADC configured to receive signals from the TIA.

4. The method as claimed in claim 2, wherein a resistance of the output resistance is ranged between 100 ohm and 1000 ohm when an array size of the crossbar array is 128×128 or 256×256.

5. The method as claimed in claim 4, wherein a maximum of an input voltage of the crossbar array is 0.2 V.

6. The method as claimed in claim 1, wherein an initial conductance of the crossbar array is generated during the S1.

7. The method as claimed in claim 1, wherein the calibrating step is configured to let the simulation model accounting for device physics and circuit issues of the crossbar array.

8. The method as claimed in claim 1, wherein the simulation result comprises an ideal and real current data, and an ideal and real vector-matrix multiplication results of the crossbar array.

9. A non-transitory computer-readable storage medium storing one or more programs, the one or more programs comprising instructions, which when executed by a computing system with one or more processors, cause the computing system to execute a method of simulating a crossbar array circuit having a crossbar array, comprising steps of:
   S1. testing the crossbar array;
   S2. calibrating a simulation model;
   S3. simulating the crossbar array with the simulation model, wherein a simulation result is generated after the S3;
   S4. determining a fixed ratio of ideal current from the simulation result;
   S5. adjusting conductance mapping value to let the crossbar array pass the fixed ratio of ideal current and generating a conductance matrix;
   S6. programming the conductance matrix to the crossbar array;
   S7. passing an input signal to the crossbar array and generating a computing result; and
   S8. checking the quality of computing results; if the computing results are qualified, transmitting the computing results; if the computing results are not qualified, adjusting the conductance mapping value with consideration of programming errors and defects, and returning to S5.

10. The non-transitory computer-readable storage medium as claimed in claim 9, wherein the crossbar array circuit further comprises:
    one or many of cross-point devices;
    an output resistance Rout connected to the crossbar array; and
    an ADC configured to receive signals from the crossbar array.

11. The non-transitory computer-readable storage medium as claimed in claim 9, wherein the crossbar array circuit further comprises:
    one or many of cross-point devices;
    an output resistance connected to the crossbar array;
    a TIA connected to the output resistance; and
    an ADC configured to receive signals from the TIA.

12. The non-transitory computer-readable storage medium as claimed in claim 10, wherein a resistance of the output resistance is ranged between 100 ohm and 1000 ohm when an array size of the crossbar array is 128×128 or 256×256.

13. The non-transitory computer-readable storage medium as claimed in claim 9, wherein an initial conductance of the crossbar array is generated during the S1.

14. The non-transitory computer-readable storage medium as claimed in claim 9, wherein the calibrating step is configured to let the simulation model accounting for device physics and circuit issues of the crossbar array.

15. The non-transitory computer-readable storage medium as claimed in claim 9, wherein the simulation result comprises an ideal and real current data, and an ideal and real vector-matrix multiplication results of the crossbar array.

* * * * *